US009924332B2

(12) United States Patent
Akimoto et al.

(10) Patent No.: US 9,924,332 B2
(45) Date of Patent: Mar. 20, 2018

(54) TRANSMISSION MANAGEMENT SYSTEM, MANAGEMENT METHOD, AND COMPUTER-READABLE RECORDING MEDIUM

(71) Applicants: Yuya Akimoto, Tokyo (JP); Naoki Umehara, Kanagawa (JP)

(72) Inventors: Yuya Akimoto, Tokyo (JP); Naoki Umehara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 243 days.

(21) Appl. No.: 14/691,790

(22) Filed: Apr. 21, 2015

(65) Prior Publication Data

US 2015/0312729 A1 Oct. 29, 2015

(30) Foreign Application Priority Data

Apr. 28, 2014 (JP) ................. 2014-093061

(51) Int. Cl.
| | | |
|---|---|---|
| G06F 15/177 | (2006.01) | |
| H04W 4/08 | (2009.01) | |
| H04W 60/04 | (2009.01) | |
| H04N 7/15 | (2006.01) | |
| H04L 29/06 | (2006.01) | |
| H04M 3/56 | (2006.01) | |
| H04L 29/08 | (2006.01) | |
| H04L 12/18 | (2006.01) | |

(52) U.S. Cl.
CPC ........... *H04W 4/08* (2013.01); *H04L 12/1818* (2013.01); *H04L 63/104* (2013.01);
(Continued)

(58) Field of Classification Search
CPC ............... H04L 65/1093; H04L 65/403; H04L 65/1069; H04L 67/327; H04L 63/104;
(Continued)

(56) References Cited

U.S. PATENT DOCUMENTS

2006/0123077 A1* 6/2006 Munetsugu ....... H04L 29/12009
709/203
2011/0196948 A1* 8/2011 Yamauchi ............... H04M 3/54
709/222

(Continued)

FOREIGN PATENT DOCUMENTS

| EP | 2 765 753 A1 | 8/2014 |
|---|---|---|
| JP | 2006-074453 | 3/2006 |

(Continued)

OTHER PUBLICATIONS

Extended European Search Report dated Sep. 7, 2015 in European Application 15164795.5.

*Primary Examiner* — Jungwon Chang
(74) *Attorney, Agent, or Firm* — Oblon, McClelland, Maier & Neustadt, L.L.P.

(57) ABSTRACT

A transmission management system includes a memory that stores destination information indicating destination candidates of a request source terminal, a receiver that receives a destination registration request designating one or more destination terminals as the destination candidates, processing circuitry that, when approval of the destination registration request can be omitted, registers one or more request destination terminals in the destination information as the destination candidates, and a transmitter that, when the approval of the destination registration request cannot be omitted, transmits the approval request to the one or more request destination terminals. The receiver receives a response to the approval request from the one or more request destination terminals. The processing circuitry registers the request destination terminal in the destination information of the request source terminal as a destination candidate.

14 Claims, 19 Drawing Sheets

(52) U.S. Cl.
CPC ...... *H04L 65/1069* (2013.01); *H04L 65/1093* (2013.01); *H04L 65/403* (2013.01); *H04L 67/327* (2013.01); *H04M 3/567* (2013.01); *H04N 7/15* (2013.01); *H04W 60/04* (2013.01)

(58) Field of Classification Search
CPC ......... H04W 4/08; H04W 60/04; G06F 21/44; G06F 21/572; H04M 3/56; H04M 3/54; H04M 3/567; H04N 7/15
USPC ................ 709/224, 203, 222; 370/262, 261; 726/21; 713/2; 348/14.12, 14.11; 2/224, 2/203
See application file for complete search history.

(56) References Cited

U.S. PATENT DOCUMENTS

| | | | | |
|---|---|---|---|---|
| 2011/0246644 | A1* | 10/2011 | Hamada | H04L 43/0811 709/224 |
| 2012/0002003 | A1* | 1/2012 | Okita | H04L 12/1827 348/14.11 |
| 2012/0185685 | A1* | 7/2012 | Volmat | G06F 21/572 713/2 |
| 2012/0311052 | A1 | 12/2012 | Lee et al. | |
| 2013/0125234 | A1* | 5/2013 | Nishiyama | H04N 1/32048 726/21 |
| 2013/0223292 | A1* | 8/2013 | Okuyama | H04L 65/1069 370/261 |
| 2013/0242038 | A1* | 9/2013 | Umehara | H04L 12/1818 348/14.12 |
| 2014/0362741 | A1 | 12/2014 | Okuyama et al. | |
| 2015/0062286 | A1 | 3/2015 | Akimoto et al. | |
| 2015/0304361 | A1* | 10/2015 | Tamura | H04M 3/56 370/262 |

FOREIGN PATENT DOCUMENTS

| | | |
|---|---|---|
| JP | 2013-085208 | 5/2013 |
| JP | 2014-155128 | 8/2014 |
| JP | 2015-050552 | 3/2015 |

* cited by examiner

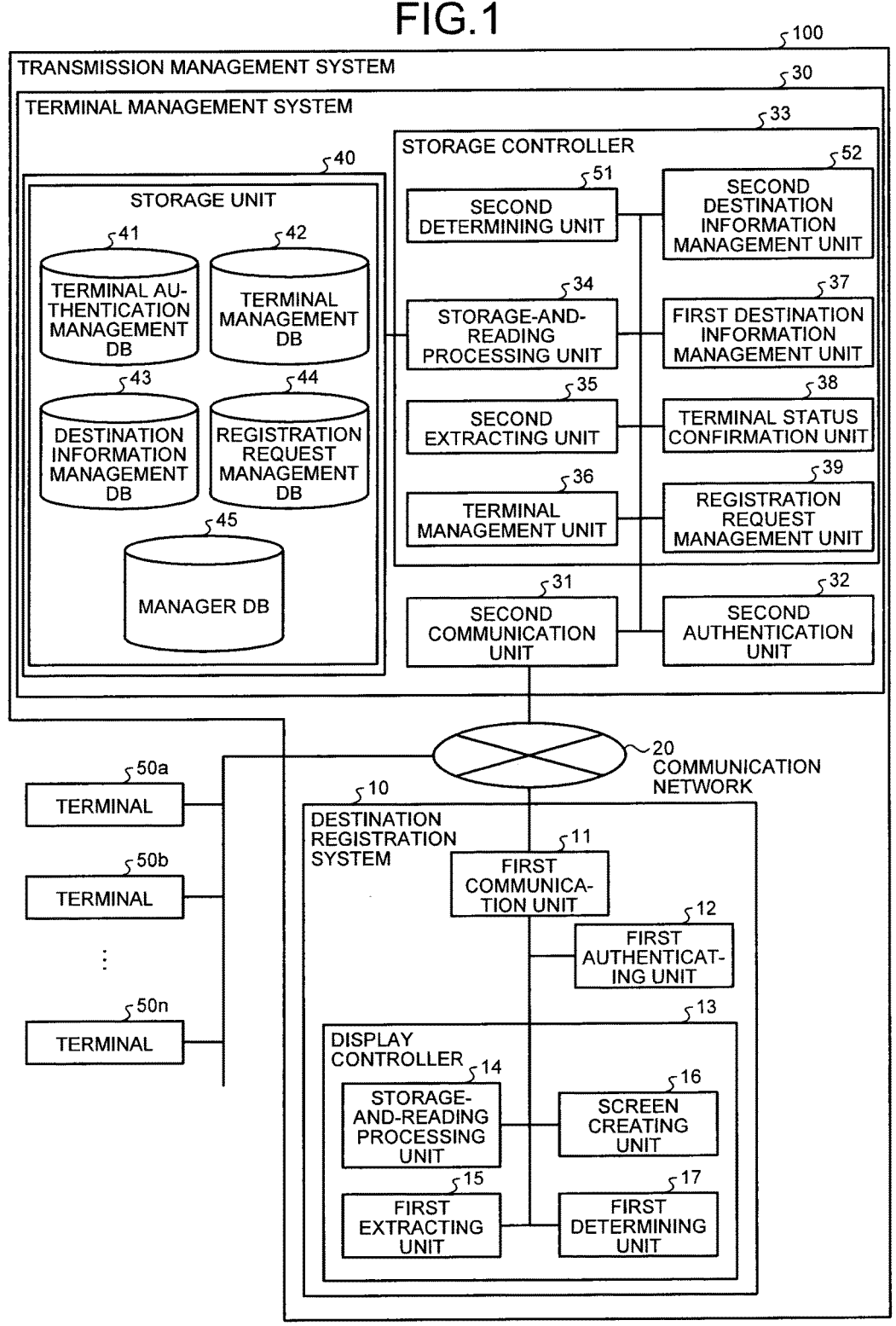

FIG.2

| TERMINAL ID | PASSWORD |
|---|---|
| 01aa | aaaa |
| 01ab | abab |
| 01ac | acac |
| ... | ... |

FIG.3

| TERMINAL ID | NAME | OPERATING STATUS | RECEPTION DATE AND TIME | IP ADDRESS |
|---|---|---|---|---|
| 01aa | TERMINAL AA, TOKYO OFFICE, JAPAN | ONLINE (TRANSMITTABLE) | 2012.08.20.13:40 | 1.2.1.3 |
| 01ab | TERMINAL AB, TOKYO OFFICE, JAPAN | OFFLINE | 2012.08.19.12:00 | 1.2.1.4 |
| ... | ... | ... | ... | ... |
| 01ba | TERMINAL BA, OSAKA OFFICE, JAPAN | ONLINE (SUSPENDED) | 2012.08.20.13:45 | 1.2.2.3 |
| 01bb | TERMINAL BB, OSAKA OFFICE, JAPAN | ONLINE (DURING TRANSMISSION) | 2012.08.20.13:50 | 1.2.2.4 |
| ... | ... | ... | ... | ... |
| 01ca | TERMINAL CA, NEW YORK OFFICE, USA | OFFLINE | 2012.08.20.12:45 | 1.3.1.3 |
| 01cb | TERMINAL CB, NEW YORK OFFICE, USA | ONLINE (DURING TRANSMISSION) | 2012.08.20.13:55 | 1.3.1.4 |
| ... | ... | ... | ... | ... |
| 01da | TERMINAL DA, WASHINGTON OFFICE, USA | ONLINE (DURING TRANSMISSION) | 2012.08.18.12:45 | 1.3.2.3 |
| 01db | TERMINAL DB, WASHINGTON OFFICE, USA | ONLINE (TRANSMITTABLE) | 2012.08.20.12:45 | 1.3.2.4 |
| ... | ... | ... | ... | ... |

FIG.4

| TERMINAL ID | DESTINATION TERMINAL ID |
|---|---|
| 01aa | 01ab, ···, 01ba, 01bb, ···, 01ca, 01cb, 01da, 01db |
| 01ab | 01aa, 01ba, 01cb |
| 01ba | 01aa, 01ab, 01ca, 01cb, 01da, 01db |
| ··· | ··· |

FIG.5

| REQUEST SOURCE TERMINAL ID | REQUEST DESTINATION TERMINAL ID |
|---|---|
| 01aa | 01dc |
| 01ab | 01ca |
| 01ab | 01da |
| ··· | ··· |

FIG.6

| MANAGER ID | PASSWORD | MANAGEMENT TERMINAL ID |
|---|---|---|
| 02A | AAAA | 01aa, 01ab, 01ac, 01ad, ···<br>01AA, 01AB, 01AC, 01AD, ··· |
| 02B | BBBB | 01ba, 01bb, ···<br>01BA, 01BB, ··· |
| 02C | CCCC | 01ca, ···<br>01CA, ··· |
| ··· | ··· | ··· |

FIG.11

○ TERMINAL AUTHENTICATION:

TERMINAL ID    [_____]

PASSWORD    [_____]

[LOGIN]

◉ MANAGER AUTHENTICATION:

MANAGER ID    [_____]

PASSWORD    [_____]

[NEW REGISTRATION] [LOGIN]

FIG.12

MANAGER REGISTRATION:

MANAGER ID    [_____]

PASSWORD    [_____]

PASSWORD (CONFIRMATION)    [_____]

[REGISTER] [CANCEL]

FIG.13

|  | | | LOGGED IN WITH 02A |
|---|---|---|---|
| MANAGEMENT TERMINAL LIST: | RESET DESTINATIONS | MUTUALLY REGISTER DESTINATIONS | MUTUALLY DELETE DESTINATIONS |
| REGISTER TERMINAL | DELETE TERMINAL | REGISTER DESTINATION | DELETE DESTINATION | LOGOUT |

|  | NAME | TERMINAL ID | DESTINATION TERMINAL ID |
|---|---|---|---|
| ☐ | TERMINAL AA, TOKYO OFFICE, JAPAN | 01aa | 01ab, ···, 01ba, 01bb, ···, 01ca, 01cb, 01da, 01db |
| ☐ | TERMINAL AB, TOKYO OFFICE, JAPAN | 01ab | 01aa, 01ba, 01cb |
| ☐ | TERMINAL AC, TOKYO OFFICE, JAPAN | 01ac | 01aa |
| ☐ | ... | ... | ... |

FIG.15

MANAGEMENT TERMINAL
REGISTRATION:

REGISTRATION
TERMINAL ID

REGISTRATION
TERMINAL ID

REGISTRATION
TERMINAL ID

[REGISTER] [CANCEL]

FIG.16

MANAGEMENT
TERMINAL DELETION:

DELETION
TERMINAL ID

DELETION
TERMINAL ID

DELETION
TERMINAL ID

[DELETE] [CANCEL]

FIG.18

DESTINATION TERMINAL
REGISTRATION:

| REGISTRATION TERMINAL ID | | ☐ OMIT APPROVAL |
| REGISTRATION TERMINAL ID | | ☐ OMIT APPROVAL |
| REGISTRATION TERMINAL ID | | ☐ OMIT APPROVAL |

REGISTER    CANCEL

FIG.19A
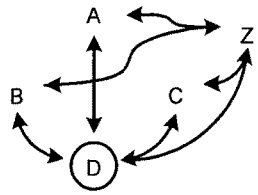
FIG.19B
| TERMINAL ID | DESTINATION TERMINAL ID |
|---|---|
| A | Z |
| B | Z |
| C | Z |
| D | Z |
| Z | A, B, C, D |
| TERMINAL ID | DESTINATION TERMINAL ID |
|---|---|
| A | D, Z |
| B | D, Z |
| C | D, Z |
| D | A, B, C, Z |
| Z | A, B, C, D |
FIG.19C
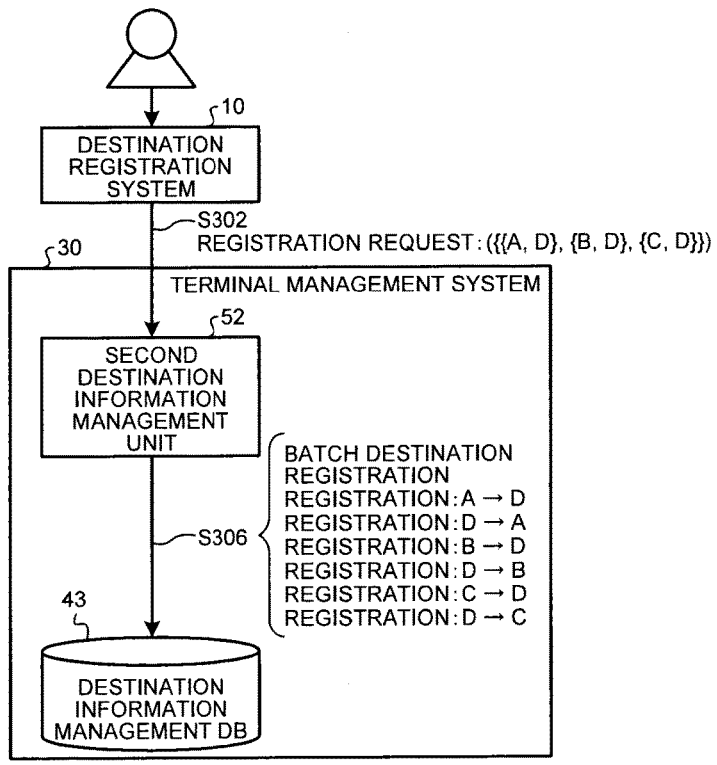

FIG.22A
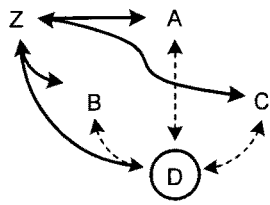
FIG.22B
| TERMINAL ID | DESTINATION TERMINAL ID |
|---|---|
| A | D, Z |
| B | D, Z |
| C | D, Z |
| D | A, B, C, Z |
| Z | A, B, C, D |
| TERMINAL ID | DESTINATION TERMINAL ID |
|---|---|
| A | Z |
| B | Z |
| C | Z |
| D | Z |
| Z | A, B, C, D |
FIG.22C
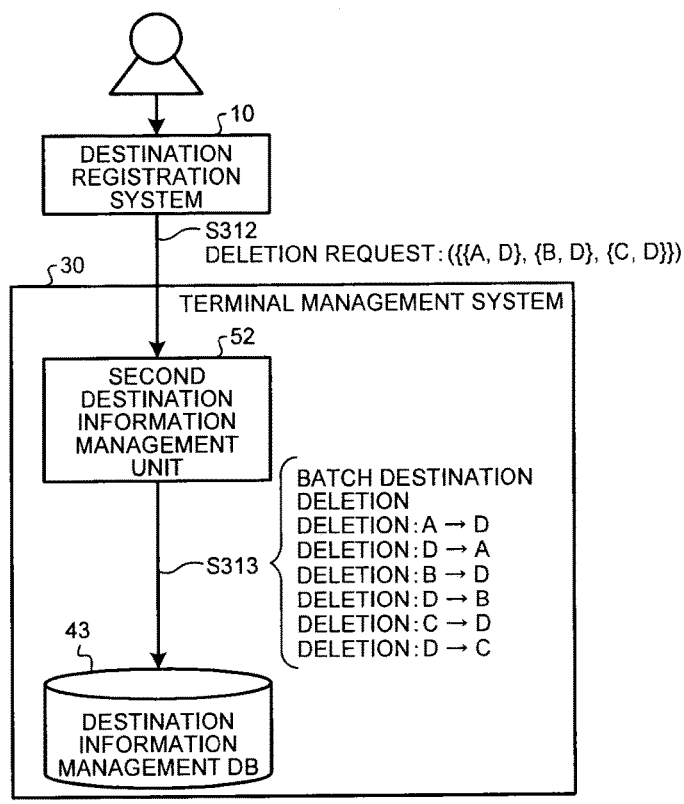

FIG.24B

| TERMINAL ID | DESTINATION TERMINAL ID |
|---|---|
| A | B, C, D, Z |
| B | A, C, D, Z |
| C | A, B, D, Z |
| D | A, B, C, Z |
| Z | A, B, C, D |

⇩

| TERMINAL ID | DESTINATION TERMINAL ID |
|---|---|
| A | Z |
| B | Z |
| C | Z |
| D | Z |
| Z | A, B, C, D |

FIG.25A
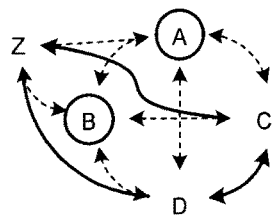
FIG.25B
| TERMINAL ID | DESTINATION TERMINAL ID |
|---|---|
| A | B, C, D, Z |
| B | A, C, D, Z |
| C | A, B, D, Z |
| D | A, B, C, Z |
| Z | A, B, C, D |
⇩
| TERMINAL ID | DESTINATION TERMINAL ID |
|---|---|
| A |  |
| B |  |
| C | D, Z |
| D | C, Z |
| Z | C, D |
FIG.25C
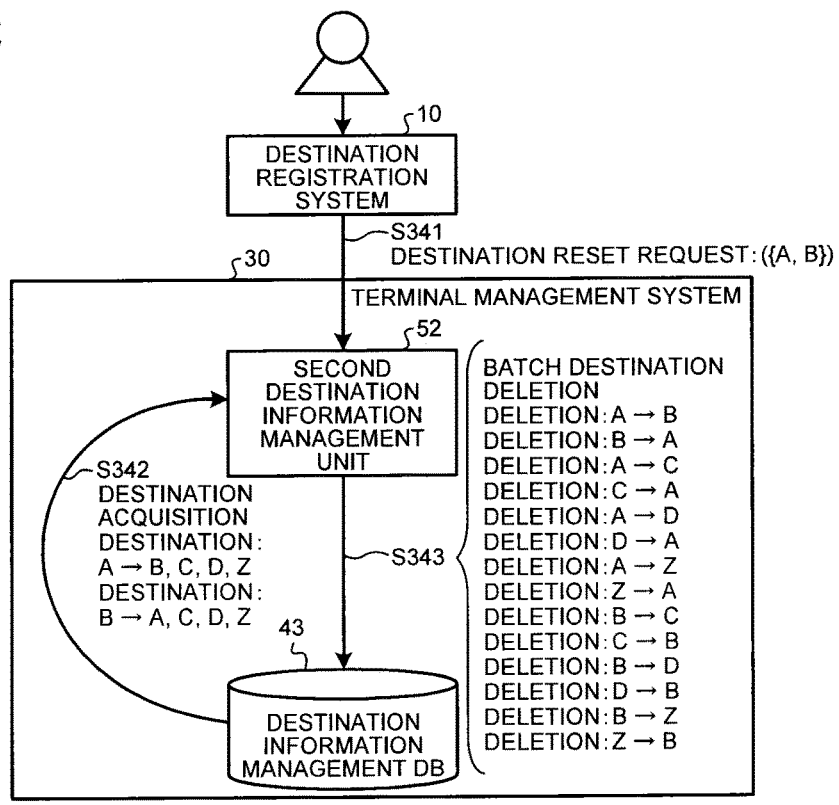

TRANSMISSION MANAGEMENT SYSTEM, MANAGEMENT METHOD, AND COMPUTER-READABLE RECORDING MEDIUM

CROSS-REFERENCE TO RELATED APPLICATIONS

The present application claims priority to and incorporates by reference the entire contents of Japanese Patent Application No. 2014-093061 filed in Japan on Apr. 28, 2014.

BACKGROUND OF THE INVENTION

1. Field of the Invention

The present invention relates to a transmission management system, a management method, and a computer-readable recording medium.

2. Description of the Related Art

Terminal systems that communicate between remote locations via a communication network such as the Internet become widely used. Examples of the terminal systems include conference systems that perform teleconferences. In a general conference system, in order to convey images and voices of a conference room to a conference room at the other end, first, images and voices of the conference room are photographed and collected using a terminal at the conference room where one of the parties, such as a participant, is holding a remote conference. The conference system then converts the images and voices into digital data and transmits the digital data to the terminal of the conference room at the other end. The conference system then displays the images on the display of the terminal of the conference room at the other end and outputs the voices to speakers. With this processing, a conference between remote places can be performed in a state close to an actual conference.

In such a terminal system, a technique is known that registers terminals serving as destinations of communication as destination candidates in order to simply call terminals as communication partners. Japanese Patent Application Laid-open No. 2006-074453, for example, discloses an invention of a videophone and videoconference system that stores therein terminal information at both ends as destination candidates at a first conference, thereby enabling the destination candidates to be selected and called at the next and following conferences.

However, when initially setting the terminal system that is installed, when the number of the terminals is large, and when managers of the terminals are different, for example, processing relating to the registration or deletion of the destinations of the terminals and user's operations relating to the registration or deletion of the destinations of the terminals have become complicated when considering security issues at the same time such as whether each of the terminals is permitted to register or delete destinations managers of the terminals.

In view of the above, there is a need to provide a transmission management system, a management method, and a computer program that can perform the registration of destinations of terminals more smoothly.

SUMMARY OF THE INVENTION

It is an object of the present invention to at least partially solve the problems in the conventional technology.

According to the present invention, there is provided a transmission management system comprising: a memory that stores destination information indicating destination candidates of a request source terminal of communication; a receiver that receives a destination registration request designating one or more destination terminals as the destination candidates of the request source terminal; processing circuitry that, when approval of the destination registration request can be omitted, registers one or more request destination terminals in the destination information as destination candidates of the request source terminal; and a transmitter that, when the approval of the destination registration request cannot be omitted, transmits an approval request for the destination registration request to the one or more request destination terminals designated as the destination candidates, wherein, the receiver receives a response to the approval request from the one or more request destination terminals, and the processing circuitry registers the request destination terminal that transmitted the response to the approval request indicating approval in the destination information of the request source terminal as a destination candidate.

The present invention also provides a management method for a transmission management system that manages destination information indicating destination candidates of a request source terminal of communication, the method comprising: receiving a destination registration request designating one or more destination terminals as the destination candidates of the request source terminal; registering one or more request destination terminals in the destination information as destination candidates of the request source terminal when approval of the destination registration request can be omitted; transmitting an approval request for the destination registration request to the one or more request destination terminals designated as the destination candidates when the approval of the destination registration request cannot be omitted; receiving a response to the approval request from the one or more request destination terminals; and registering the request destination terminal that transmitted the response to the approval request indicating approval in the destination information of the request source terminal as a destination candidate.

The present invention also provides A non-transitory computer-readable recording medium that contains a computer program that causes a computer to execute: receiving a destination registration request designating one or more destination terminals as the destination candidates of the request source terminal; registering one or more request destination terminals in the destination information as destination candidates of the request source terminal when approval of the destination registration request can be omitted; transmitting an approval request for the destination registration request to the one or more request destination terminals designated as the destination candidates when the approval of the destination registration request cannot be omitted; receiving a response to the approval request from the one or more request destination terminals; and registering the request destination terminal that transmitted the response to the approval request indicating approval in the destination information of the request source terminal as a destination candidate.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a diagram illustrating an example of the configuration of a transmission management system of an embodiment of the present invention;

FIG. 2 is a diagram illustrating an example of a terminal authentication management DB of the embodiment;

FIG. 3 is a diagram illustrating an example of a terminal management DB of the embodiment;

FIG. 4 is a diagram illustrating an example of a destination information management DB of the embodiment;

FIG. 5 is a diagram illustrating an example of a registration request management DB of the embodiment;

FIG. 6 is a diagram illustrating an example of a manager DB of the embodiment;

FIG. 11 is a diagram illustrating an example of an authentication screen of the transmission management system of the embodiment;

FIG. 12 is a diagram illustrating an example of a manager registration screen of the transmission management system of the embodiment;

FIG. 13 is a diagram illustrating an example of a management terminal list screen of the transmission management system of the embodiment;

FIG. 15 is a diagram illustrating an example of a management terminal registration screen of the transmission management system of the embodiment;

FIG. 16 is a diagram illustrating an example of a management terminal deletion screen of the transmission management system of the embodiment;

FIG. 18 is a diagram illustrating an example of a destination terminal registration screen of the transmission management system of the embodiment;

FIG. 19A is a diagram illustrating a specific example of destination registration of the embodiment;

FIG. 19B is a diagram illustrating a specific example of the destination registration of the embodiment;

FIG. 19C is a diagram illustrating a specific example of the destination registration of the embodiment;

FIG. 22A is a diagram illustrating a specific example of destination deletion of the embodiment;

FIG. 22B is a diagram illustrating a specific example of the destination deletion of the embodiment;

FIG. 22C is a diagram illustrating a specific example of the destination deletion of the embodiment;

FIG. 23C is a diagram illustrating a specific example of the mutual destination registration of the embodiment;

FIG. 24B is a diagram illustrating a specific example of the mutual destination deletion of the embodiment;

FIG. 25A is a diagram illustrating a specific example of destination reset of the embodiment;

FIG. 25B is a diagram illustrating a specific example of the destination reset of the embodiment;

FIG. 25C is a diagram illustrating a specific example of the destination reset of the embodiment.

DETAILED DESCRIPTION OF THE PREFERRED EMBODIMENTS

Figure 7:
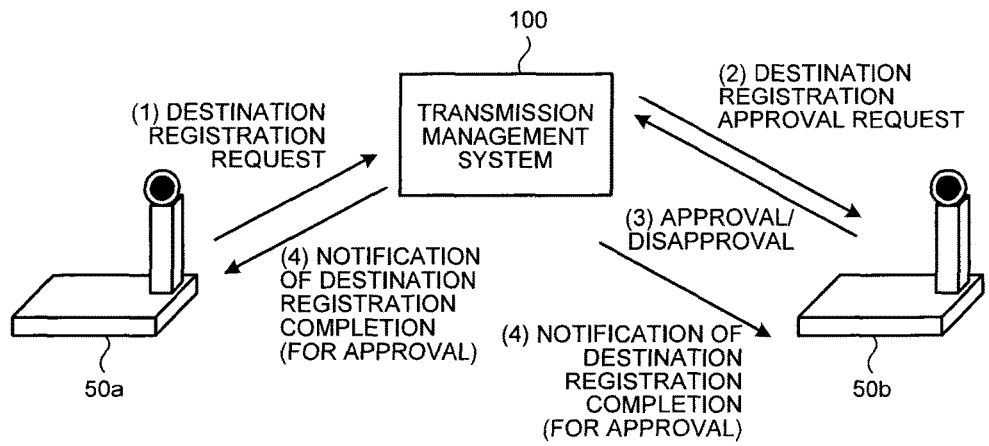
FIG. 7 is a diagram illustrating an example in a case of registering a destination when the transmission management system of the embodiment is logged in with a terminal ID.

The following describes embodiments of a transmission management system, a management method, and a computer-readable recording medium having a computer program in detail with reference to accompanying drawings. FIG. 1 is a diagram for illustrating an example of a configuration of a transmission management system 100 of the embodiment.

The transmission management system 100 includes a destination registration system 10, a communication network 20, and a terminal management system 30. Terminals 50a through 50n are connected to the communication network 20. The number of the terminals 50a through 50n may be any number. Hereinafter, when the terminals 50a through 50n are not distinguished from each other, they will be simply referred to as terminal 50. The destination registration system 10, the terminal management system 30, and the terminal 50 are connected to each other via the communication network 20. The communication mode of the communication network 20 may be wired or wireless.

The terminal management system 30 will be described first. The terminal management system 30 includes a second communication unit 31, a second authentication unit 32, a storage controller 33, and a storage unit 40. The storage controller 33 includes a storage-and-reading processing unit 34, a second extracting unit 35, a terminal management unit 36, a first destination information management unit 37, a terminal status confirmation unit 38, a registration request management unit 39, a second determining unit 51, and a second destination information management unit 52. The storage unit 40 includes a terminal authentication management DB 41, a terminal management DB 42, a destination information management DB 43, a registration request management DB 44, and a manager DB 45.

FIG. 2 is a diagram illustrating an example of the terminal authentication management DB 41 of the embodiment. Each record of the terminal authentication management DB 41 includes a terminal ID and a password. The terminal ID is identification information for identifying the terminal 50. The password is a password for connecting to the transmission management system 100 with the terminal ID. The terminal ID and the password may be information stored in the terminal in advance or may be information input to the terminal by a user. The terminal ID and the password may be information read from an external storage medium by the terminal. The record of the terminal authentication management DB 41 may include any column other than the above ones.

FIG. 3 is a diagram illustrating an example of the terminal management DB 42 of the embodiment. Each record of the terminal management DB 42 includes a terminal ID, a name, an operating status, a reception date and time, and a terminal IP address. The terminal ID is identification information for identifying the terminal 50. The name may be the name of the terminal 50, the name of the user of the terminal 50, or the name of a site. The operating status is an operating status of the terminal 50. The reception date and time is a date and time when a connection request from the terminal 50 to the transmission management system 100 is received. The IP address is an IP address of the terminal 50. The record of the terminal management DB 42 may include any column other than the above ones.

FIG. 4 is a diagram illustrating an example of the destination information management DB 43 of the embodiment. Each record of the destination information management DB 43 includes a terminal ID and a destination terminal ID. The terminal ID is identification information for identifying the terminal 50. The destination terminal ID is the terminal ID of another terminal 50 stored as a destination candidate of the terminal 50. In other words, the destination information management DB 43 stores therein, for each terminal 50, other terminals 50 communicable with the terminal 50. The record of the destination information management DB 43 may include any column other than the above ones.

FIG. 5 is a diagram illustrating an example of the registration request management DB 44 of the embodiment. Each record of the registration request management DB 44 includes a request source terminal ID and a request destination terminal ID. The request source terminal ID is identification information for identifying the terminal 50 that requested the registration of a destination. The request destination terminal ID is identification information for identifying the terminal 50 requested by the terminal 50 identified by the request source terminal ID as a destination to be registered. The record of the registration request management DB 44 may include any column other than the above ones.

FIG. 6 is a diagram illustrating an example of the manager DB 45 of the embodiment. Each record of the manager DB 45 includes a manager ID, a password, and a management terminal ID. The manager ID is identification information for identifying a manager of the terminal 50. The manager ID may be an e-mail address or a user name of a user. The password is a password for connecting to the transmission management system 100 with the manager ID. The management terminal ID is the terminal ID of the terminal 50 managed by a manager identified by the manager ID. Although, in FIG. 6, one record associates the manager ID with a plurality of management terminal IDs, a plurality of separate records may be assigned to the respective management terminal IDs associated with the manager ID. The record of the manager DB 45 may include any column other than the above ones.

Returning back to FIG. 1, the second communication unit 31 communicates with other units via the communication network 20. The second authentication unit 32 performs authentication for causing the terminal 50 to connect to communication functions (functions such as a videoconference using the terminal 50) of the transmission management system 100. The second authentication unit 32 searches the terminal authentication management DB 41 of the storage unit 40 with a terminal ID and a password contained in login information received by the second communication unit 31 as search keys. The second authentication unit 32 determines whether the search keys and the information of the terminal authentication management DB 41 match, thereby performing authentication whether or not the connection to the communication functions of the transmission management system 100 is permitted.

The storage-and-reading processing unit 34 performs processing to store data in the storage unit 40. The storage-and-reading processing unit 34 performs processing to read the data stored in the storage unit 40.

The second extracting unit 35 searches the destination information management DB 43 with the terminal ID of the terminal 50 that requested connection to the transmission management system 100 as a search key and reads the destination terminal ID registered as a destination of the terminal 50 that requested connection. The second extracting unit 35 searches the terminal management DB 42 with the extracted terminal ID as a search key and reads an operating status of the terminal 50 for each extracted terminal ID. This processing causes the second extracting unit 35 to acquire the operating status of the terminal 50 that requested connection to the transmission management system 100 and the operating status of the terminal 50 stored as the destination of the terminal 50 that requested connection to the transmission management system 100. The acquired destination terminal ID and the operating status corresponding to the destination terminal ID are transmitted to the terminal 50 that requested connection to the transmission management system 100 via the second communication unit 31. This processing causes destination information corresponding to the destination terminal ID to be displayed on the terminal 50 and enables the user of the terminal 50 to establish a session between the terminals by designating a desired destination from the destination information, thereby achieving a communication function between the terminals. The establishment of the session between the terminals 50 may be mediated by the transmission management system 100 or may be directly exchanged without it. Content data can be exchanged in the session with the destination terminal. Examples of the content data include image data, voice data, and text data. The image data includes still images and moving images.

The second extracting unit 35 may search the destination information management DB 43 with the terminal ID of the terminal 50 that requested connection to the transmission management system 100 as a search key and extract the terminal ID of a record having the terminal 50 that requested connection as the destination terminal ID. This processing may cause the second extracting unit 35 to acquire the operating status of the terminal 50 storing, as a destination, the terminal 50 that requested connection.

The terminal management unit 36 manages the operating status of the terminal 50 that requested connection to the communication functions (functions such as a videoconference using the terminal 50) of the transmission management system 100. The terminal management unit 36 updates the record of the terminal management DB 42 corresponding to the terminal ID of the terminal 50 that requested connection to the communication functions of the transmission management system 100. Specifically, the terminal management unit 36 changes the operating status from offline to online (transmittable) and updates the reception date and time, and the IP address.

The first destination information management unit 37 performs processing to add the destination terminal ID to the record of the destination information management DB 43 when approval of a destination registration request received from the destination registration system 10 cannot be omitted. A case when the approval of a destination registration request cannot be omitted is, for example, a case when a user who is logged in to the destination registration system 10, is not logged in with the manager ID of the manager of the terminal 50 to be registered as a destination. In other words, a user of a terminal 50 of a request source who does not have manager authority of a terminal 50 of a destination registration request destination is prevented from registering the terminal 50 of the request destination into the destination information of the terminal 50 of the destination registration request source unilaterally, without obtaining the approval of the manager of the terminal 50 of the request destination.

When a record of the destination information management DB 43 is added, specifically, the first destination information management unit 37 first extracts a record of the registration request management DB 44. The first destination information management unit 37 then transmits a destination registration approval request to the terminal 50 identified by the request destination terminal ID of the extracted record via the second communication unit 31. The first destination information management unit 37 then receives a response to the destination registration approval request via the second communication unit 31. If the response indicates approval, the first destination information management unit 37 then extracts a record of the destination information management DB 43 in which the request source terminal ID of the registration request management DB 44 and the terminal ID of the destination information management DB 43 match. The first destination information management unit 37 then adds the request destination terminal ID of the record of the registration request management DB 44 having the request source terminal ID to the destination terminal ID of the extracted record.

The terminal status confirmation unit 38 searches the terminal management DB 42 to confirm the operating status of the terminal 50. The terminal status confirmation unit 38, for example, when the first destination information management unit 37 transmits an approval request for a destination registration request, confirms the operating status of a terminal 50 of a transmission destination.

The registration request management unit 39 performs the addition and deletion of records of the registration request management DB 44. When a destination registration request is received from the destination registration system 10, and when approval of the registration request cannot be omitted, the registration request management unit 39 adds a record that associates the request source terminal ID and the request destination terminal ID contained in the registration request to the registration request management DB 44. When the registration of the destination information by the first destination information management unit 37 is completed, the registration request management unit 39 deletes the record of the registration request management DB 44 corresponding to the destination information of which the registration has been completed.

When a destination registration request is received from the destination registration system 10 via the second communication unit 31, the second determining unit 51 determines whether or not approval of the destination registration request is necessary. If the approval of the destination registration request is necessary, the second determining unit 51 requests the first destination information management unit 37 to register the destination. If the approval of the destination registration request is not necessary, the second determining unit 51 requests the second destination information management unit 52 to register the destination.

The second destination information management unit 52 changes (including adds and deletes) the record of the destination information management DB 43 when approval of destination operation processing can be omitted. The destination operation processing includes destination registration processing, destination deletion processing, mutual destination registration processing, mutual destination deletion processing, and destination reset processing. The respective pieces of processing will be described below with reference to FIG. 17 through FIG. 25C. The second destination information management unit 52, for example, performs processing to add the destination terminal ID of the destination information management DB 43 when the approval of the destination registration request can be omitted.

The case when the approval of the destination registration request can be omitted is, for example, a case when the destination registration system 10 is logged in using the manager ID of the manager of the terminal 50, and the destination operation processing is performed on the terminal 50 managed by the manager ID. The case when the approval of the destination registration request can be omitted may also be a case when the request source terminal ID and the request destination terminal ID match at least partially. This case is effective when the way of managing the terminal 50 is changed in accordance with the way of assigning the terminal ID.

Next, the destination registration system 10 will be described. The destination registration system 10 includes a first communication unit 11, a first authenticating unit 12, and a display controller 13. The display controller 13 includes a storage-and-reading processing unit 14, a first extracting unit 15, a screen creating unit 16, and a first determining unit 17. The first communication unit 11, the storage-and-reading processing unit 14, and the first extracting unit 15 are the same as the second communication unit 31, the storage-and-reading processing unit 34, and the second extracting unit 35, respectively, and descriptions thereof will be omitted. Although the destination registration system 10 does not include the storage unit, accessing the storage unit 40 via the communication network 20 enables the storage-and-reading processing unit 14 and the first extracting unit 15 to achieve the same functions as those of the storage-and-reading processing unit 34 and the second extracting unit 35, respectively.

The first authenticating unit 12 performs authentication for connecting to management functions (functions such as the addition and deletion of the managed terminal 50 or destinations of the terminal 50) of the destination registration system 10. The first authenticating unit 12 searches the terminal authentication management DB 41 (or the manager DB 45) of the storage unit 40 with a terminal ID (or a manager ID) and a password contained in login information received by the first communication unit 11 as search keys. The first authenticating unit 12 determines whether or not the search keys and the information of the terminal authentication management DB 41 (or the manager DB 45) match, thereby performing authentication whether or not connection to the management functions of the transmission management system 100 is permitted.

The screen creating unit 16 creates an authentication screen (refer to FIG. 11), a manager registration screen (refer to FIG. 12), a management terminal list screen (refer to FIG. 13), a management terminal registration screen (refer to FIG. 15), a management terminal deletion screen (refer to FIG. 16), a destination terminal registration screen (refer to FIG. 18), a destination terminal deletion screen (refer to FIG. 21), or the like. The screen creating unit 16 creates the screens in HyperText Markup Language (HTML), for example.

The first determining unit 17 determines processing performed in accordance with operations on the screens created by the screen creating unit 16. When a "Register destination" button is pressed on the management terminal list screen (refer to FIG. 13), for example, the first determining unit 17 determines performing of the destination registration processing. When a "Delete destination" button is pressed on the management terminal list screen, the first determining unit 17 determines performing of the destination deletion processing. When a "Mutually register destinations" button is pressed on the management terminal list screen, the first determining unit 17 determines performing of the mutual destination registration processing. When a "Mutually delete destinations" button is pressed on the management terminal list screen, the first determining unit 17 determines performing of the mutual destination deletion processing. When a "Reset destinations" button is pressed on the management terminal list screen, the first determining unit 17 determines performing of the destination reset processing. The respective pieces of processing will be described below with reference to FIG. 17 through FIG. 25C.

Figure 8:
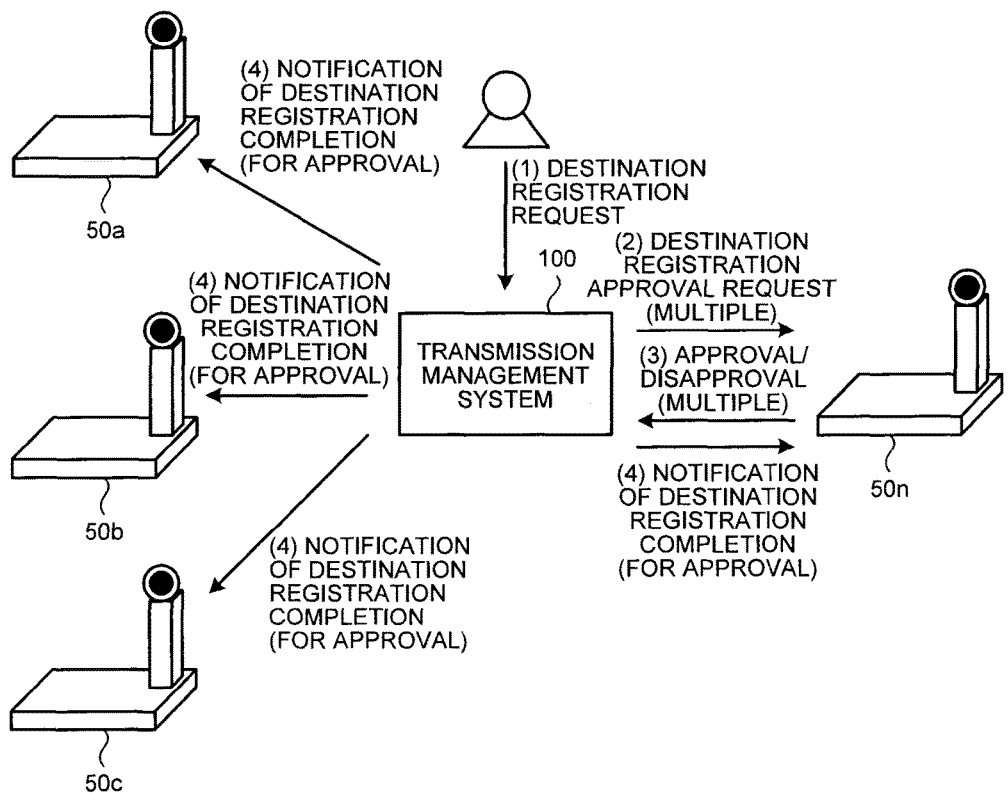
FIG. 8 is a diagram illustrating an example in a case of registering a destination (with approval) when the transmission management system of the embodiment is logged in with a manager ID.
Figure 9:
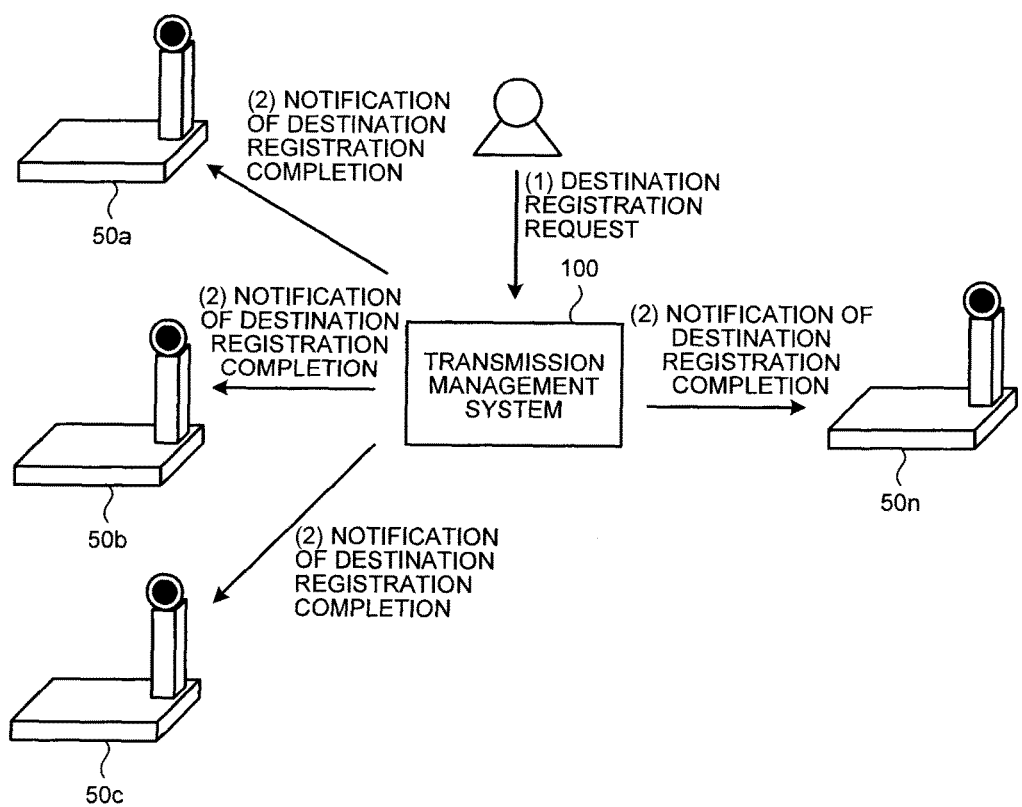
FIG. 9 is a diagram illustrating an example in a case of registering a destination (approval omitted) when the transmission management system of the embodiment is logged in with a manager ID.

Described next with reference to FIG. 7 through FIG. 9 is a difference in the destination registration processing between when the transmission management system 100 (the destination registration system 10) of the embodiment is logged in with the terminal ID and when it is logged in with the manager ID.

FIG. 7 is a diagram for illustrating an example in a case of registering a destination when the transmission management system 100 of the embodiment is logged in with the terminal ID. The terminal 50a connects to the transmission management system 100 with the terminal ID of the terminal 50a. The terminal 50a transmits a destination registration request indicating a registration request that checks whether the terminal 50b may be registered as a destination of the terminal 50a to the transmission management system 100 ((1)). The transmission management system 100 transmits a destination registration approval request indicating a registration approval request to the terminal 50b ((2)). The terminal 50b transmits a response indicating approval or disapproval to the transmission management system 100 ((3)). When a response indicating approval is received, the transmission management system 100 registers the destination and transmits a notification of destination registration completion indicating the completion of the destination registration to the terminal 50a and the terminal 50b ((4)).

FIG. 8 is a diagram for illustrating an example in a case of registering a destination (with approval) when the transmission management system 100 of the embodiment is logged in with the manager ID. The transmission management system 100 receives connection with the manager ID of a manager. This reception of connection may be received from the terminal 50 exclusively for the manager or may be received from the terminal 50 for general purpose use. The manager (the terminal 50 operated by the manager) transmits a destination registration request indicating a registration request that checks whether or not the terminal 50n may be registered as a destination of the terminals 50a, 50b, and 50c to the transmission management system 100 ((1)). The transmission management system 100 transmits a destination registration approval request indicating a registration approval request to the terminal 50n ((2)). The terminal 50n transmits a response indicating approval or disapproval to the transmission management system 100 ((3)). When a response indicating approval is received, the transmission management system 100 registers the destination and transmits a notification of destination registration completion indicating the completion of the destination registration to the terminal 50a, terminal 50b, terminal 50c, and terminal 50n ((4)).

FIG. 9 is a diagram for illustrating an example in a case of registering a destination (approval omitted) when the transmission management system 100 of the embodiment is logged in with the manager ID. The transmission management system 100 receives connection with the manager ID of a manager. This reception of connection may be received from the terminal 50 exclusively for the manager or may be received from the terminal 50 for general purpose use. The manager (the terminal 50 operated by the manager) transmits a destination registration request indicating a registration request that checks whether or not the terminal 50n may be registered as a destination of the terminals 50a, 50b, and 50c to the transmission management system 100 ((1)). The transmission management system 100 registers the destination without sending a registration approval request (a destination registration approval request) to the terminal 50n and transmits a notification of destination registration completion indicating the completion of the destination registration to the terminal 50a, terminal 50b, terminal 50c, and terminal 50n ((2)). FIG. 9 omits procedures compared to a case of FIG. 8. When the manager IDs of the terminal 50a, terminal 50b, and terminal 50c are the same as the manager ID of the terminal 50n, for example, the transmission management system 100 of the embodiment performs the destination registration even when the transmission of the registration approval request (destination registration approval request) and the response indicating approval are absent.

Figure 10:
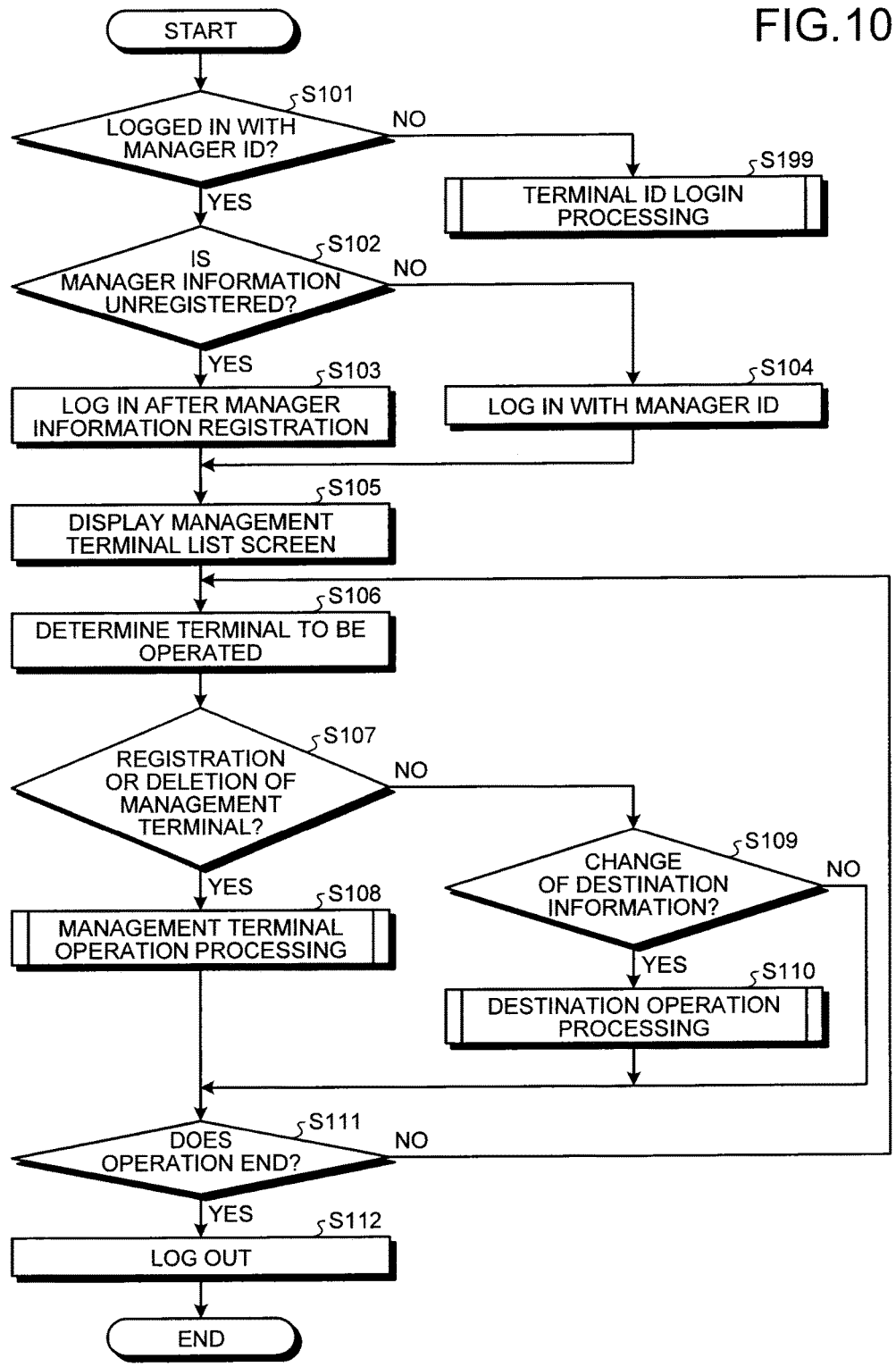
FIG. 10 is a flowchart illustrating a method for managing a terminal and destination information of the terminal of the transmission management system of the embodiment.

Described next is a method for managing the terminal 50 and destination information of the terminal 50 of the transmission management system 100 of the embodiment. FIG. 10 is a flowchart illustrating a method for managing the terminal 50 and the destination information of the terminal 50 of the transmission management system 100 of the embodiment. The first authenticating unit 12 determines whether or not a connection request is received from the terminal 50 operated by the manager with the manager ID via the communication network 20 (Step S101). If the connection request is received with the manager ID (Yes at Step S101), the process advances to Step S102. If the connection request is not received with the manager ID (the connection request is received with the terminal ID) (No at Step S101), terminal ID login processing is performed (Step S199).

The terminal ID login processing is processing that limits the destination registration processing in the case of login with the manager ID. In other words, the terminal ID login processing cannot perform processing to perform destination registration when the response indicating approval is absent. The terminal ID login processing cannot perform batch registration of terminals to be destinations using the record of the manager DB 45. For the other processing, the terminal ID login processing is the same as the destination registration processing with the manager ID. Given these circumstances, a detailed description for the terminal ID login processing will be omitted, and the following describes the destination registration processing with the manager ID as an example.

FIG. 11 is a diagram illustrating an example of an authentication screen of the transmission management system 100 of the embodiment. The authentication screen in FIG. 11 is, for example, displayed on the terminal 50 operated by the manager before the connection request at Step S101.

Returning back to FIG. 10, the first authenticating unit 12 determines whether or not manager information such as the password is registered in the manager DB 45 (Step S102). If the manager information is registered in the manager DB 45 (No at Step S102), connection to the transmission management system 100 is performed with the manager ID (Step S104). If the manager information is not registered in the manager DB 45 (Yes at Step S102), a registration screen is displayed on the terminal 50 operated by the manager, the manager information input to the registration screen is registered in the manager DB 45, and then connection to the transmission management system 100 is performed (Step S103). Examples of a case when the manager information is not registered in the manager DB 45 include those using the manager ID for the first time using an initial setting password.

FIG. 12 is a diagram illustrating an example of the manager registration screen of the transmission management system 100 of the embodiment. At Step S103, the manager registration screen in FIG. 12 is displayed to the user, for example.

Returning back to FIG. 10, the screen creating unit 16 creates the management terminal list screen, transmits it to the terminal 50 operated by the manager, and displays it on the screen (Step S105).

FIG. 13 is a diagram illustrating an example of the management terminal list screen of the transmission management system 100 of the embodiment. The management terminal list screen displays names associated with the terminals 50 managed with the manager ID used in the login to the transmission management system 100, terminal IDs, and destination terminal IDs (the terminal IDs of the respective terminals 50 stored in association as the destinations of the respective terminals 50 identified by the respective terminal IDs). The management terminal list screen is created based on information (names, terminal IDs, and destination terminal IDs) obtained by the destination registration system 10 from the storage unit 40 of the terminal management system 30 via the communication network 20. Specifically, first, the manager DB 45 is searched with the manager ID received by the destination registration system 10 as a search key to acquire the management terminal IDs associated with the manager ID. The destination information management DB 43 is searched with the acquired management terminal IDs as search keys to acquire the destination terminal IDs associated with the respective management terminal IDs. The terminal management DB 42 is searched with the acquired management terminal IDs as search keys to acquire the names associated with the respective management terminal IDs.

Returning back to FIG. 10, the screen creating unit 16 then determines a terminal 50 to be operated of the destination information management DB 43 (Step S106). Specifically, the screen creating unit 16 determines a terminal selected (may be in a multiple manner) by a checkbox in the management terminal list screen (refer to FIG. 13) to be the terminal 50 to be operated of the destination information management DB 43.

The first determining unit 17 then determines whether or not the input by the user is registration (or deletion) of the terminal 50 (Step S107). Specifically, the first determining unit 17 determines the input to be registration of the terminal 50 when a "Register terminal" button is pressed on the management terminal list screen (refer to FIG. 13) and determines the input to be deletion of terminal 50 when a "Delete terminal" button is pressed on the management terminal list screen. In the case of registration (or deletion) of the terminal 50 (Yes at Step S107), the transmission management system 100 performs management terminal operation processing (Step S108). The management terminal operation processing will be described below with reference to FIG. 14 through FIG. 16. In the case of no registration (or deletion) of the terminal 50 (No at Step S107), the process advances to Step S109.

The first determining unit 17 then determines whether or not the input by the user is a change of the destination information of the terminal 50 stored in the destination information management DB 43 (refer to FIG. 4) (Step S109). The destination operation processing related to the change of the destination information includes the destination registration processing, destination deletion processing, mutual destination registration processing, mutual destination deletion processing, and destination reset processing. Specifically, when the "Register destination" button is pressed on the management terminal list screen (refer to FIG. 13), the first determining unit 17 determines performing of the destination registration processing. When the "Delete destination" button is pressed on the management terminal list screen, the first determining unit 17 determines performing of the destination deletion processing. When the "Mutually register destinations" button is pressed on the management terminal list screen, the first determining unit 17 determines performing of the mutual destination registration processing. When the "Mutually delete destinations" button is pressed on the management terminal list screen, the first determining unit 17 determines performing of the mutual destination deletion processing. When the "Reset destinations" button is pressed on the management terminal list screen, the first determining unit 17 determines performing of the destination reset processing.

If the input by the user is a change of the destination information of the terminal 50 (Yes at Step S109), the transmission management system 100 performs the destination operation processing (Step S110). The destination operation processing (the destination registration processing, destination deletion processing, mutual destination registration processing, mutual destination deletion processing, and destination reset processing) will be described below with reference to FIG. 17 through FIG. 25C. If the input by the user is not a change of the destination information of the terminal 50 (No at Step S109), the process advances to Step S111.

The first determining unit 17 determines whether or not operation ends (whether or not a logout operation has been performed) (Step S111). Specifically, the first determining unit 17 determines whether or not a "Logout" button has been pressed on the management terminal list screen (refer to FIG. 13). If the logout operation has been performed (Yes at Step S111), logout from the transmission management system 100 is performed (Step S112). If the log out operation has not been performed (No at Step S112), the process returns to Step S106.

Figure 14:
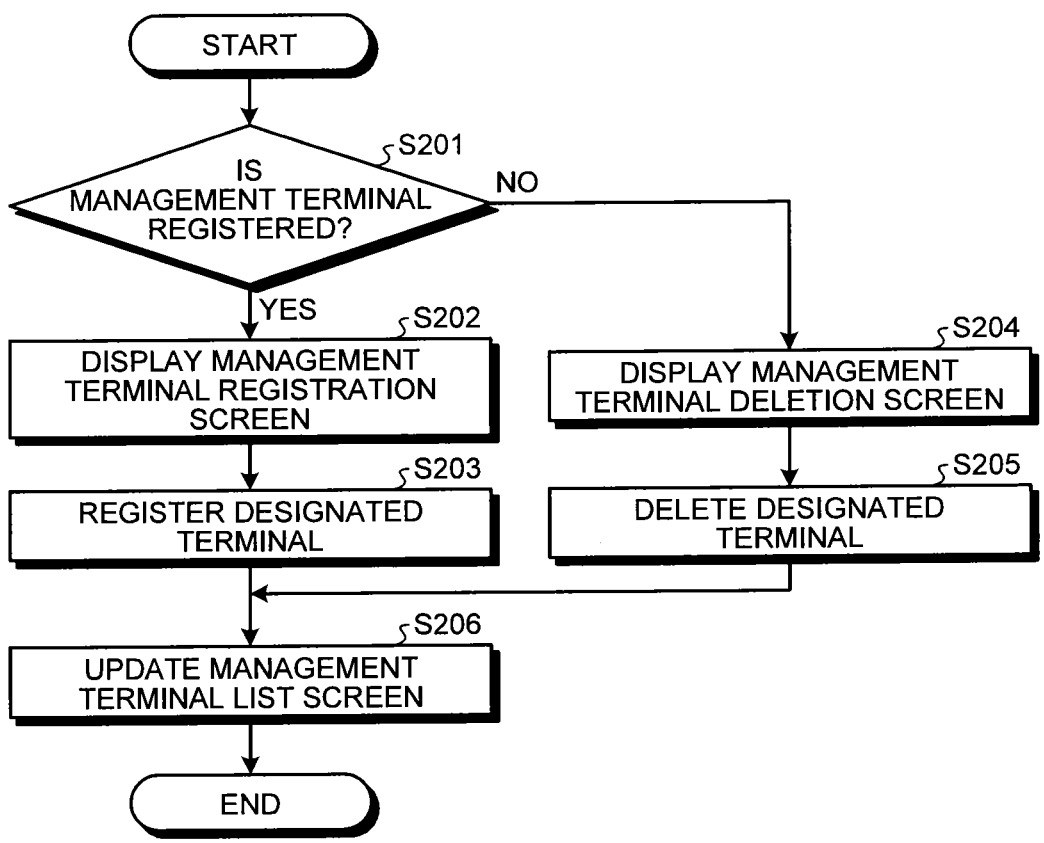
FIG. 14 is a flowchart for illustrating a method (management terminal operation processing) for registering and deleting a terminal managed by the transmission management system of the embodiment.

Next, the management terminal operation processing will be described. FIG. 14 is a flowchart illustrating a method (management terminal operation processing) for registering and deleting the terminal 50 by the transmission management system 100 of the embodiment illustrated at Step S108 in FIG. 10. In accordance with input (the pressing of the "Register terminal" button or the "Delete terminal" button on the management terminal list screen in FIG. 13) using the terminal 50 operated by the user (operator), the first determining unit 17 determines whether or not the input is registration of the terminal 50 (Step S201). If the input is registration of the terminal 50 (Yes at Step S201), the screen creating unit 16 displays the management terminal registration screen (Step S202).

FIG. 15 is a diagram illustrating an example of the management terminal registration screen of the transmission management system 100 of the embodiment. FIG. 15 is an example when the user inputs (may be in a multiple manner) the terminal ID of the terminal 50 the user desires to register as a management terminal. The terminal ID may be input by designating a file that describes the terminal ID (such as the designation of a path necessary for the screen creating unit 16 to refer to the file).

Returning back to FIG. 14, next, when a "Register" button on the management terminal registration screen is pressed, the first communication unit 11 transmits a registration request including the input terminal ID and the manager ID to the terminal management system 30, and the storage-and-reading processing unit 34 of the terminal management system 30 adds the input terminal ID to the management terminal ID of the record of the manager DB 45 having the manager ID used in the login (Step S203). The screen creating unit 16 then displays the added terminal ID and the name and the destination terminal ID associated with the terminal ID, thereby updating the management terminal list screen (Step S206).

If the input is not registration of the terminal 50 (No at Step S201), the screen creating unit 16 displays the management terminal deletion screen (Step S204).

FIG. 16 is a diagram illustrating an example of the management terminal deletion screen of the transmission management system 100 of the embodiment. FIG. 16 is an example when the user inputs (may be in a multiple manner) the terminal ID of the terminal 50 that the user desires to delete from the management terminals. The terminal ID may be input by designating a file that describes the terminal ID (such as the designation of a path necessary for the screen creating unit 16 to refer to the file).

Returning back to FIG. 14, next, when a "Delete" button on the management terminal registration screen is pressed, the first communication unit 11 transmits a deletion request including the input terminal ID and manager ID used in the login to the terminal management system 30, and the storage-and-reading processing unit 34 of the terminal management system 30 deletes the input terminal ID from the management terminal ID of the record of the manager DB 45 having the manager ID (Step S205). The screen creating unit 16 then deletes the display of the deleted terminal ID and the name and the destination terminal ID associated with the terminal ID, thereby updating the management terminal list screen (Step S206).

In the processing at Step S203, the storage-and-reading processing unit 14 of the destination registration system 10 may directly update the record of the manager DB 45 (add the terminal ID to the management terminal ID of the record of the manager ID logged in). Similarly, in the processing at Step S205, the storage-and-reading processing unit 14 of the destination registration system 10 may directly update the record of the manager DB 45 (delete the terminal ID from the management terminal ID of the record of the manager ID logged in).

Figure 17:
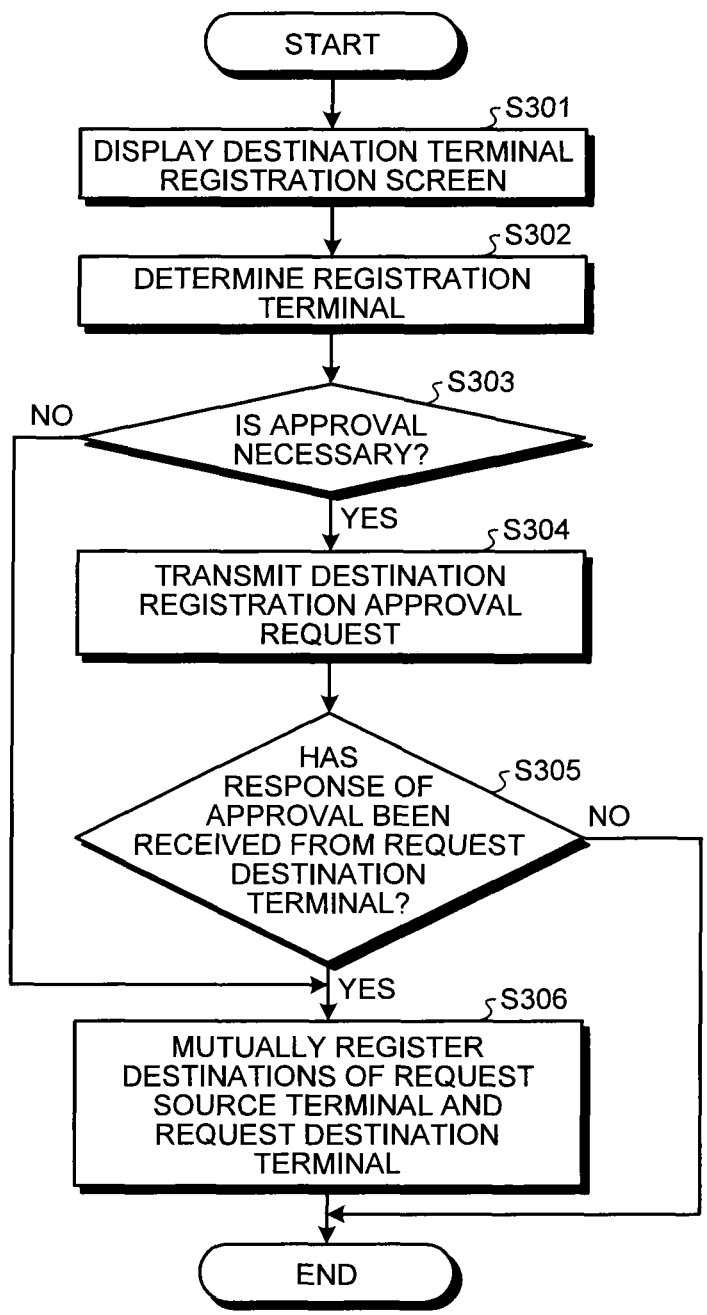
FIG. 17 is a flowchart illustrating destination operation processing (for destination registration processing) of a terminal managed by the transmission management system of the embodiment.

Described next is the destination registration processing when the "Register destination" button on the management terminal list screen in FIG. 13 is pressed. FIG. 17 is a flowchart for illustrating the destination operation processing (for the destination registration processing) of the terminal 50 managed by the transmission management system 100 of the embodiment illustrated at Step S110 in FIG. 10. Specifically, FIG. 17 is a flowchart when the terminal 50 to be operated of the destination information management DB 43 is selected by the checkbox in the management terminal list screen in FIG. 13, and the "Register destination" button is pressed. Because of being logged in with the manager ID as described in the description of FIG. 10, this flowchart can perform functions such as destination registration with approval omitted and batch registration of terminals to be destinations compared to a case of being logged in with the terminal ID. First, the destination registration system 10 (the screen creating unit 16) displays a screen that receives input of the terminal 50 to be registered as a destination (Step S301).

FIG. 18 is a diagram illustrating an example of the destination terminal registration screen of the transmission management system of the embodiment. Checkboxes are displayed as items selecting whether or not approval processing at Steps S303 and S304 described below is omitted for each terminal 50 to be registered as a destination. A condition for displaying the checkbox may be when the destination registration system 10 inquires the terminal management system 30 about whether or not the terminal ID of the terminal 50 as the destination registration request source (the terminal 50 determined at Step S106 in FIG. 10) and the terminal ID of the terminal 50 as the destination registration request destination (the terminal ID of the terminal 50 input to the screen in FIG. 18) are associated with the same manager ID based on the information of the manager DB 45 and it is determined that they are the same. When it is determined that both the terminals 50 are not managed by the same manager, the checkbox is not displayed, and the approval processing at S303 described below is not skipped. It may be processed such that approval is certainly omitted when the checkbox itself is not present and the terminals 50 share the same manager (are associated with the same manager) based on the manager DB 45. This processing can be achieved by causing the destination registration system 10 to transmit the destination registration request to the terminal management system 30 via the communication network 20 and causing the terminal management system 30 to refer to the information of the manager DB 45 stored in the storage unit 40. Although FIG. 18 illustrates an example in which the user inputs the terminal ID, the terminal ID may be input by, for example, designating a file that describes the terminal ID (such as the designation of a path necessary for the screen creating unit 16 to refer to the file).

Returning back to FIG. 17, the destination registration system 10 (the screen creating unit 16) determines a registration terminal to be registered in accordance with the input to the destination terminal registration screen illustrated in FIG. 18 (Step S302). Describing with the destination terminal registration screen in FIG. 18 as an example, in response to the pressing of a "Register" button, the registration terminal is determined by an input registration terminal ID. The registration terminal ID (the terminal ID as the destination registration request destination) is transmitted from the destination registration system 10 to the terminal management system 30 by the first communication unit 11. More specifically, the first communication unit 11 of the destination registration system 10 transmits the destination registration request to the terminal management system 30. The registration request contains the terminal ID of the terminal 50 as the destination registration request source (the terminal 50 determined at Step S106 in FIG. 10), the terminal ID of the terminal 50 as the destination registration request destination (the terminal 50 input to the screen of FIG. 18), and the logged in manager ID. When displayed by the checkbox in FIG. 18, the registration request further contains information indicating that determination corresponding to the selection of the checkbox is necessary and information indicating for which registration terminal approval can be omitted in accordance with the selection of the checkbox.

The terminal management system 30 (the second determining unit 51) then determines whether or not the approval processing is necessary for each terminal 50 to be registered as a destination based on the received registration request (Step S303). Specifically, if the received registration request contains the information indicating that determination corresponding to the selection of the checkbox is necessary (if the checkbox is displayed in FIG. 18), the second determining unit 51 determines that the approval processing is not necessary for the registration terminal the checkbox of which has been selected and that the approval processing is necessary for the registration terminal of which the checkbox has not been selected.

If the registration request does not contain the information indicating that determination corresponding to the selection of the checkbox is necessary (if the checkbox is not displayed in FIG. 18), the second determining unit 51 determines whether or not the terminal ID as the destination request source and the terminal ID as the destination request destination are associated with the same manager ID by referring to the manager DB 45 and determines that the approval processing is not necessary if they are associated with the same manager ID and determines that the approval processing is necessary if they are not associated with the same manager ID.

When only the terminal ID associated with the manager ID of the manager who is logged in the manager DB 45 can be originally input as the registration terminal ID on the screen illustrated in FIG. 18, it is determined that the approval processing is not necessary for all the registration terminals without determining whether or not the terminal ID is associated with the same manager ID by the terminal management system 30 (the second determining unit 51).

If it is determined that the approval processing is not necessary (No at Step S303), the second destination information management unit 52 mutually registers the terminals 50 of the other side as destination terminals in the destination information of the terminal 50 as the destination registration request source and the destination information of the terminal 50 as the destination registration request destination (Step S306). Specifically, the second destination information management unit 52 mutually adds the terminal ID of the terminals 50 of the other side to the destination terminal ID of the record of the destination information management DB 43 the terminal ID of which is the terminal ID (the destination request source terminal ID and the destination request destination terminal ID) contained in the received registration request.

If it is determined that the approval processing is necessary (Yes at Step S303), the transmission management system 100 (the first destination information management unit 37) transmits a destination registration approval request to the terminal 50 to be registered as a destination (Step S304). More specifically, the processing at Step S304 is performed by the following processing, for example. First, the terminal management system 30 (the registration request management unit 39) adds a record that associates the request source terminal ID and the request destination terminal ID contained in the received registration request with each other to the registration request management DB 44 (refer to FIG. 5) for all combinations of the destination request source terminal and the destination request destination terminal (the registration terminal) for which the approval processing was determined to be necessary at Step S303. The terminal management system 30 (the terminal status confirmation unit 38) then confirms the operating status of the request destination terminal (the registration terminal) by referring to the terminal management DB 42 using the request destination terminal ID of the registration request management DB 44. If the operating status is communicable (online (transmittable), for example), the terminal management system 30 (the second communication unit 31) transmits a destination registration approval request to the request destination terminal (the registration terminal). To the request destination terminal (the registration terminal) the operating status of which is incommunicable (offline, for example), the terminal management system 30 (the second communication unit 31) transmits an approval request when the operating status is updated to be communicable.

The transmission management system 100 then determines whether or not an approval response has been received from the destination request destination terminal to which the approval request was transmitted (Step S305). More specifically, for example, the terminal management system 30 (second communication unit 31) receives a response to the destination registration approval request from the terminal 50, and the terminal management system 30 (first destination information management unit 37) determines whether or not the response to the destination registration approval request indicates approval.

If the approval response has been received (Yes at Step S305), the terminal management system 30 (first destination information management unit 37) mutually registers the terminals 50 of the other side as destination terminals in the destination information of the terminal 50 as the destination registration request source and the destination information of the terminal 50 as the destination registration request destination (Step S306). Specifically, the first destination information management unit 37 adds the terminal ID of the terminals 50 of the other side to the destination terminal ID of the corresponding records of the destination information management DB 43 (the record of the terminal 50 as the destination registration request source and the record of the terminal 50 as the destination registration request destination) based on the information of the registration request management DB 44.

If the approval response has not been received (No at Step S305), the destination registration processing ends without performing destination registration.

At Step S306, only the terminal 50 as the registration request source may be registered in the destination of the terminal 50 as the registration request source, without mutually registering the terminals 50 of the other side as the destination terminals. Upon completing the registration, the terminal management system 30 (the second communication unit 31) may send a notification that the addition of the destination has been completed to the terminal 50 corresponding to the terminal ID associated with the updated record of the destination information management DB 43.

When the processing at Step S306 is performed by the first destination information management unit 37, the terminal management system 30 (the registration request management unit 39) deletes the record of the registration request management DB 44 for which registration has been completed. For a combination of the destination request source terminal ID and the destination request destination terminal ID for which approval was determined to be not necessary at Step S303, no record is added to the registration request management DB 44, and there is no need of deletion.

Described next is a specific example of data processing at the time of destination registration (when approval is not necessary) according to the flowchart in FIG. 17. FIG. 19A through FIG. 19C are diagrams illustrating a specific example of the destination registration of the embodiment. FIG. 19A illustrates an example of a case where the terminal D is added to the respective pieces of destination information of A, B, and C (refer to the lower-row diagram of FIG. 19B) while the terminal 50 (Z) is registered in advance as a destination in the respective pieces of destination information of four terminals 50 (A, B, C, and D) (refer to the upper-row diagram of FIG. 19B).

The operation of the specific example of the data processing of the destination registration will be described with reference to FIG. 19C. First, the destination registration system 10 determines a registration terminal to be registered in accordance with the input to the destination terminal registration screen (refer to FIG. 18) (corresponding to Step S302 in FIG. 17) and transmits a registration request to the terminal management system 30. {A, D} indicates that the request source terminal of registration to the destination information is A, whereas the request destination terminal is D. {B, D} indicates that the request source terminal of registration to the destination information is B, whereas the request destination terminal is D. {C, D} indicates that the request source terminal of registration to the destination information is C, whereas the request destination terminal is D.

The second destination information management unit 52 then performs "Registration: A→D" and "Registration: D→A" on the destination information management DB 43 in accordance with the information {A, D} contained in the registration request (corresponding to Step S306 in FIG. 17). "Registration: A→D" indicates registering the request destination terminal D in the destination information of the request source terminal A. "Registration: D→A" indicates registering the request source terminal A in the destination information of the request destination terminal D. Descriptions for "Registration: B→D," "Registration: D→B," "Registration: C→D," and "Registration: D→C" are similar to the descriptions for "Registration: A→D" and "Registration: D→A" and hence will be omitted.

The foregoing data processing updates the status of the destination information management DB 43 from the upper-row status of FIG. 19B to the lower-row status of FIG. 19B.

Figure 20:
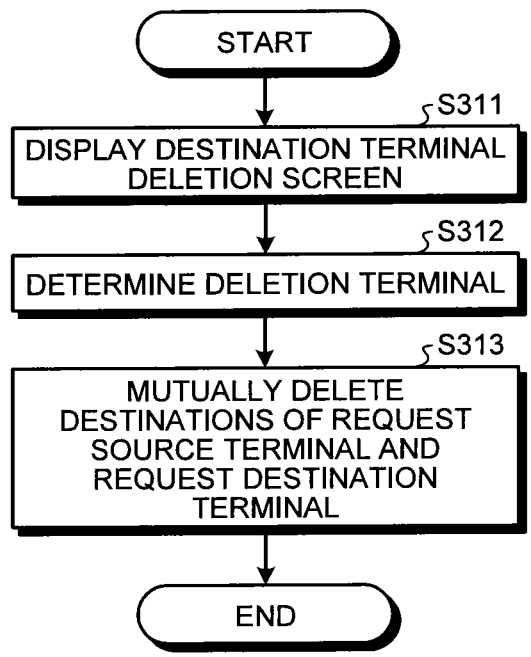
FIG. 20 is a flowchart illustrating the destination operation processing (for destination deletion processing) of a terminal managed by the transmission management system of the embodiment.

Described next is the destination deletion processing when the "Register destination" button is pressed on the management terminal list screen in FIG. 13. FIG. 20 is diagram illustrating the destination operation processing (for the destination deletion processing) of the terminal 50 managed by the transmission management system 100 of the embodiment illustrated at Step S110 in FIG. 10. Specifically, FIG. 20 is a flowchart when the terminal 50 to be operated of the destination information management DB 43 is selected by the checkbox on the management terminal list screen in FIG. 13, and the "Delete destination" button is pressed. First, the destination registration system 10 (the screen creating unit 16) displays a screen that receives input of the terminal ID of the terminal 50 to be deleted from the destination information (Step S311).

Figure 21:
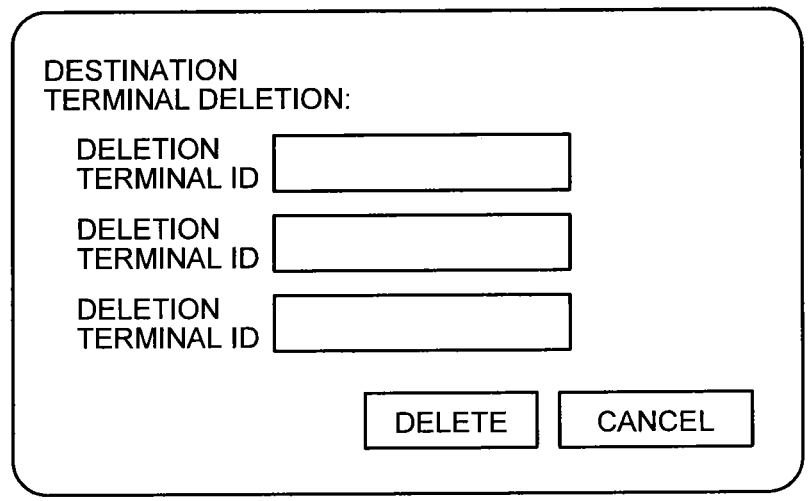
FIG. 21 is a diagram illustrating an example of a destination terminal deletion screen of the transmission management system of the embodiment.

FIG. 21 is a diagram illustrating an example of the destination terminal deletion screen of the transmission management system 100 of the embodiment. Not by such a form in which the user inputs the terminal ID as in FIG. 21, the terminal ID may be input by, for example, designating a file that describes the terminal ID (such as the designation of a path necessary for the screen creating unit 16 to refer to the file).

Returning back to FIG. 20, a deletion terminal ID is input to the destination terminal deletion screen in FIG. 21, and a "Delete" button is pressed, thereby causing the screen creating unit 16 to determine the terminal 50 to be deleted from the destination information (Step S312). The second destination information management unit 52 then deletes the terminal 50 determined at Step S312 from the destination information of the terminal to be operated (the request source terminal) determined at Step S106 in FIG. 10 and deletes the terminal to be operated (the request source terminal) determined at Step S106 in FIG. 10 from the destination information of the terminal 50 (the request destination terminal) determined at Step S312 (Step S313).

Described next is a specific example of data processing at the time of destination deletion according to the flowchart in FIG. 20. FIG. 22A through FIG. 22C are diagrams for illustrating a specific example of the destination deletion of the embodiment. FIG. 22A illustrates an example of a case where D is deleted from the respective pieces of destination information of A, B, and C (refer to the lower-row diagram of FIG. 22B), while the terminals 50 (D, Z) are registered in advance as destinations in the respective pieces of destination information of four terminals 50 (A, B, C, and D) (refer to the upper-row diagram of FIG. 22B).

The operation of the specific example of data processing of the destination deletion will be described with reference to FIG. 22C. First, the destination registration system 10 determines a deletion terminal to be deleted in accordance with the input to the destination terminal deletion screen (refer to FIG. 21) (corresponding to Step S312 in FIG. 20) and transmits a deletion request to the terminal management system 30. {A, D} indicates that the request source terminal of the deletion of the destination information is A, whereas the terminal to be deleted is D. {B, D} indicates that the request source terminal of the deletion of the destination information is B, whereas the terminal to be deleted is D. {C, D} indicates that the request source terminal of the deletion of the destination information is C, whereas the terminal to be deleted is D.

The second destination information management unit 52 then performs "Deletion: A→D" and "Deletion: D→A" on the destination information management DB 43 in accordance with the information {A, D} contained in the deletion request (corresponding to Step S313 in FIG. 20). "Deletion: A→D" indicates that the request destination terminal D is deleted from the destination information of the request source terminal A. "Deletion: D→A" indicates that the request source terminal A is deleted from the destination information of the request destination terminal D. Descriptions for "Deletion: B→D," "Deletion: D→B," "Deletion: C→D," and "Deletion: D→C" are similar to the descriptions for "Deletion: A→D" and "Deletion: D→A" and hence will be omitted.

The foregoing data processing updates the status of the destination information management DB 43 from the upper-row status of FIG. 22B to the lower-row status of FIG. 22B.

Figure 23A:
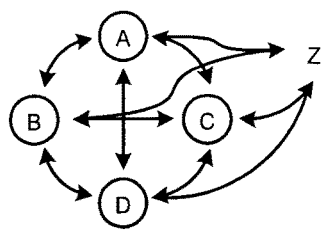
FIG. 23A is a diagram illustrating a specific example of mutual destination registration of the embodiment.
Figure 23B:
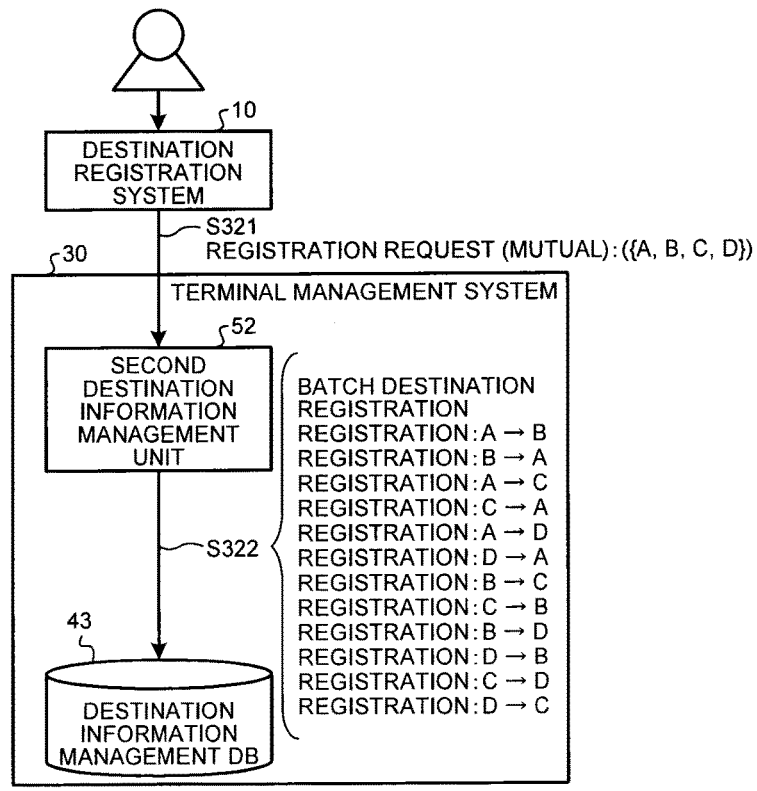
FIG. 23B is a diagram illustrating a specific example of the mutual destination registration of the embodiment.

Described next is a specific example of data processing of mutual destination registration when the "Mutually register destinations" button is pressed on the management terminal list screen in FIG. 13. FIG. 23A through FIG. 23C are diagrams for illustrating a specific example of the mutual destination registration of the embodiment. FIG. 23A illustrates an example of a case where the respective pieces of destination information of A, B, C, and D are mutually registered (refer to the lower-row diagram of FIG. 23B) while the terminal 50 (Z) is registered in advance as destinations in the respective pieces of destination information of four terminals 50 (A, B, C, and D) (refer to the upper-row diagram of FIG. 23B).

The operation of the specific example of the data processing of the mutual destination registration will be described with reference to FIG. 23C. First, the destination registration system 10 determines terminals to be mutually registered in accordance with the input to the management terminal list screen (refer to FIG. 13) (Step S321) and transmits a mutual registration request to the terminal management system 30. {A, B, C, D} indicate the terminals 50 to be mutually registered.

The second destination information management unit 52 then performs "Registration: A→B," "Registration: B→A," "Registration: A→C," "Registration: C→A," "Registration: A→D," "Registration: D→A," "Registration: B→C," "Registration: C→B," "Registration: B→D," "Registration: D→B," "Registration: C→D," and "Registration: D→C" on the destination information management DB 43 in accordance with the information {A, B, C, D} contained in the mutual registration request (Step S322). "Registration: A→B" indicates registering B in the destination information of A. Descriptions for "Registration: B→A," "Registration: A→C," "Registration: C→A," "Registration: A→D," "Registration: D→A," "Registration: B→C," "Registration: C→B," "Registration: B→D," "Registration: D→B," "Registration: C→D," and "Registration: D→C" are similar to the description for "Registration: A→B and hence will be omitted.

The foregoing data processing updates the status of the destination information management DB 43 from the upper-row status of FIG. 23B to the lower-row status of FIG. 23B.

Figure 24A:
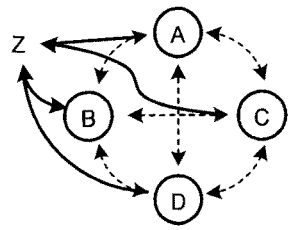
FIG. 24A is a diagram illustrating a specific example of mutual destination deletion of the embodiment.
Figure 24C:
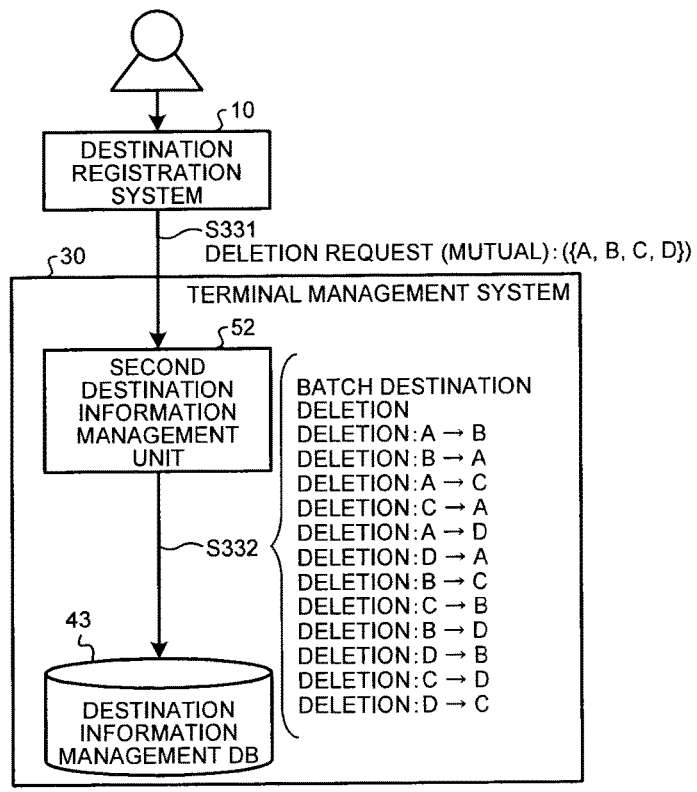
FIG. 24C is a diagram illustrating a specific example of the mutual destination deletion of the embodiment.

Described next is data processing of mutual destination deletion when the "Mutually delete destination" button is pressed on the management terminal list screen in FIG. 13. FIG. 24A through FIG. 24C are diagrams for illustrating a specific example of the mutual destination deletion of the embodiment. FIG. 24A illustrates an example of a case where the respective pieces of destination information of A, B, C, and D are mutually deleted (refer to the lower-row diagram of FIG. 24B) while the terminals 50 (A, B, C, D, and Z) are registered in advance as destinations in the respective pieces of destination information of four terminals 50 (A, B, C, and D) (refer to the upper-row diagram of FIG. 24B).

The operation of the specific example of the data processing of the mutual destination deletion will be described with reference to FIG. 24C. First, the destination registration system 10 determines terminals to be mutually deleted in accordance with the input to the management terminal list screen (refer to FIG. 13) (Step S331) and transmits a mutual deletion request to the terminal management system 30. {A, B, C, D} indicate the terminals 50 to be mutually deleted.

The second destination information management unit 52 then performs "Deletion: A→B," "Deletion: B→A," "Deletion: A→C," "Deletion: C→A," "Deletion: A→D," "Deletion: D→A," "Deletion: B→C," "Deletion: C→B," "Deletion: B→D," "Deletion: D→B," "Deletion: C→D," and "Deletion: D→C," on the destination information management DB 43 in accordance with the information {A, B, C, D} contained in the mutual deletion request (Step S332). "Deletion: A→B" indicates deleting B from the destination information of A. Descriptions for "Deletion: B→A," "Deletion: A→C," "Deletion: C→A," "Deletion: A→D," "Deletion: D→A," "Deletion: B→C," "Deletion: C→B," "Deletion: B→D," "Deletion: D→B," "Deletion: C→D," and "Deletion: D→C" are similar to the description for "Deletion: A→B" and hence will be omitted.

The foregoing data processing updates the status of the destination information management DB 43 from the upper-row status of FIG. 24B to the lower-row status of FIG. 24B.

Described next is data processing of destination reset when the "Reset destinations" button is pressed on the management terminal list screen in FIG. 13. FIG. 25A through FIG. 25C are diagrams for illustrating a specific example of the destination reset of the embodiment. FIG. 25A illustrates an example of a case where the destination information of A and B is reset (refer to the lower-row diagram of FIG. 25B) while the destination information of five terminals 50 (A, B, C, D, and Z) are mutually registered in advance (refer to the upper-row diagram of FIG. 25B).

The operation of the specific example of the data processing of the destination reset will be described with reference to FIG. 25C. First, the destination registration system 10 determines terminals to be reset in accordance with the input to the management terminal list screen (refer to FIG. 13) (Step S341) and transmits a reset request to the terminal management system 30. {A, B} indicates the terminals 50 to be reset.

The second destination information management unit 52 then acquires the destination information of A (Destination: A→B, C, D, Z) and the destination information of B (Destination: B→A, C, D, Z) from the destination information management DB 43 in accordance with the information {A, B} contained in the reset request (Step S342).

The second destination information management unit 52 then deletes all the destination information of A and B and deletes A and B from the destination information of C, D, and Z (Step S343). In other words, the second destination information management unit 52 performs "Deletion: A→B," "Deletion: B→A," "Deletion: A→C," "Deletion: C→A," "Deletion: A→D," "Deletion: D→A," "Deletion: A→Z," "Deletion: Z→A," "Deletion: B→C," "Deletion: C→B," "Deletion: B→D," "Deletion: D→B," "Deletion: B→Z," and "Deletion: Z→B" on the destination information management DB 43. "Deletion: A→B" indicates deleting B from the destination information of A. Descriptions for "Deletion: B→A," "Deletion: A→C," "Deletion: C→A," "Deletion: A→D," "Deletion: D→A," "Deletion: A→Z," "Deletion: Z→A," "Deletion: B→C," "Deletion: C→B," "Deletion: B→D," "Deletion: D→B," "Deletion: B→Z," and "Deletion: Z→B" are similar to the description for "Deletion: A→B" and hence will be omitted.

The foregoing data processing updates the status of the destination information management DB 43 from the upper-row status of FIG. 25B to the lower-row status of FIG. 25B.

As described above, the transmission management system 100 (the destination registration system 10 and the terminal management system 30) of the embodiment includes the first destination information management unit 37 and the second destination information management unit 52, thereby enabling registration and deletion of the terminal 50 to be performed more smoothly.

Figure 26:
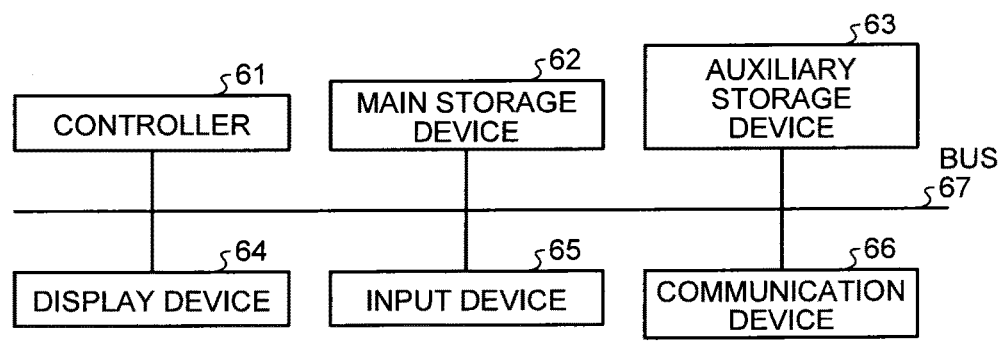
FIG. 26 is a diagram illustrating an example of a hardware configuration of a destination registration system and a terminal management system of the transmission management system of the embodiment.

FIG. 26 is a diagram for illustrating an example of the hardware configuration of the destination registration system 10 and the terminal management system 30 of the transmission management system 100 of the embodiment.

The destination registration system 10 (the terminal management system 30) of the embodiment includes a controller 61, a main storage device 62, an auxiliary storage device 63, a display device 64, an input device 65, and a communication device 66. The controller 61, the main storage device 62, the auxiliary storage device 63, the display device 64, the input device 65, and the communication device 66 are connected to each other via a bus 67.

The controller 61 executes a program read from the auxiliary storage device 63 to the main storage device 62. The main storage device 62 is a memory such as a read only memory (ROM) and a random access memory (RAM). The auxiliary storage device 63 is a hard disk drive (HDD), an optical drive, or the like. The display device 64 is a screen that displays the status or the like of the destination registration system 10 (the terminal management system 30). The display device 64 is, for example, a liquid crystal display. The input device 65 is an interface for operating the destination registration system 10 (the terminal management system 30). The input device 65 is, for example, a keyboard, a mouse, or the like. The communication device 66 is an interface for connecting to a network.

The program executed by the destination registration system 10 (the terminal management system 30) of the embodiment is recorded in a computer-readable recording medium such as a CD-ROM, a memory card, CD-R, and a digital versatile disc (DVD) as an installable and executable file and is provided as a computer program product.

The program executed by the destination registration system 10 (the terminal management system 30) of the embodiment may be stored in a computer connected to a network such as the Internet and provided by being downloaded via the network. Furthermore, the program executed by the destination registration system 10 (the terminal management system 30) of the embodiment may be provided or distributed via a network such as the Internet.

The program of the destination registration system 10 (the terminal management system 30) of the embodiment may be embedded in advance in a ROM, for example, and provided.

The program executed by the destination registration system 10 (the terminal management system 30) of the embodiment is modularized including the functional blocks in FIG. 1. As actual hardware, the controller 61 reads a program from the storage medium and executes it, thereby loading the functional blocks onto the main storage device 62. In other words, the functional blocks are generated on the main storage device 62.

Part or the whole of the functional blocks in FIG. 1 may be implemented by hardware such as an integrated circuit (IC) without being implemented by software. The storage unit 40 can be, for example, implemented as the auxiliary storage device 63, and the data of the storage unit 40 of the auxiliary storage device 63 may be loaded onto the main storage device 62 as appropriate.

The description for the above embodiment shows an example in which the transmission management system 100 is configured by the terminal management system 30 and the destination registration system 10 connected via the communication network 20. However, the transmission management system 100 may be configured by an information processing apparatus that integrally includes the terminal management system 30 and the destination registration system 10.

The transmission management system 100 of the embodiment can be used for any communication system including the terminals 50 that are communicable. The transmission management system 100 can be used for videoconference systems, teleconference systems, telephone systems (including cellular phone systems), text chat systems, whiteboard sharing systems, or the like. The terminal 50 may be an exclusive terminal for the above communication systems or may be a general-purpose terminal for personal computers, smartphones, tablet terminals, or the like. When the terminal 50 is the exclusive terminal for the above communication terminals, the terminal 50 is, for example, a projection device such as a projector, an electronic blackboard, a car navigation terminal installed in vehicles, or an image forming apparatus such as a multi-function printer (MFP) and a printer. The terminal management system 30 and the destination registration system 10 may be an information processing apparatus including the functional blocks exemplified in FIG. 1, which may be an exclusive server or may be a general-purpose terminal.

The present invention produces an effect of performing the registration of destinations of terminals more smoothly.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cashe memory of the CPU, and the RAM may function as a physical memory or a primary memory of the apparatus, while the HDD may function as a secondary memory of the apparatus.

What is claimed is:

1. A transmission management system, comprising:
   a memory that stores destination information indicating destination candidates of a request source terminal of communication;
   a receiver that receives a destination registration request designating one or more destination terminals as the destination candidates of the request source terminal from an external terminal other than the request source terminal and the one or more destination terminals, wherein the received destination registration request includes information that indicates whether a process of approval of the destination registration request is to be omitted, the process including
      transmitting an approval request for the destination registration request to the one or more request destination terminals designated at the destination candidates,
      receiving a response to the approval request from the one or more request destination terminals, and
      registering the request destination terminal that transmitted the response to the approval request indicating approval in the destination information of the request source terminal as a destination candidate,
   processing circuitry that, when approval of the destination registration request can be omitted because the received destination registration request includes the information indicating that the process of approval of the destination registration request is to be omitted, registers one or more request destination terminals in the destination information as destination candidates of the request source terminal without transmitting the approval request for the destination registration request to the one or more request destination terminals designated at the destination candidates; and
   a transmitter mat, when me approval of the destination registration request cannot be omitted because the received destination registration request does not include the information that the process of approval of the destination registration request is to be omitted, transmits an approval request for the destination registration request to the one or more request destination terminals designated as the destination candidates,
   wherein, when the receiver receives a response to the approval request from the one or more request destination terminals, the processing circuitry registers the request destination terminal that transmitted the response to the approval request indicating approval in the destination information of the request source terminal as a destination candidate.

2. The transmission management system according to claim 1, further comprising an authenticating unit that authenticates a user of the terminal, wherein
   the processing circuitry, when the user authenticated by the authenticating unit has manager authority of the request source terminal and the destination terminals, registers the one or more request destination terminals in the destination information of the request source terminal as destination candidates.

3. The transmission management system according to claim 1, wherein
   the destination registration request contains identification information of the request source terminal and identification information of the destination terminals, and
   the processing circuitry, when the identification information of the request source terminal and the identification information of the destination terminals are the same at least partially, registers the one or more request destination terminals in the destination information of the request source terminal as destination candidates.

4. The transmission management system according to claim 1, wherein
   when the approval of the destination registration request cannot be omitted, the processing circuitry further registers the approved request source terminal in destination information of the request destination terminal that transmitted the response to the approval request indicating approval as a destination candidate, and
   when the approval of the destination registration request can be omitted, the processing circuitry further registers the request source terminal in the destination information of the request destination terminal that transmitted a response to the approval request indicating approval as a destination candidate.

5. The transmission management system according to claim 1, wherein
   when the receiver receives a destination deletion request designating the one or more destination terminals, the processing circuitry deletes the one or more destination terminals designated by the destination deletion request from the destination candidates of the destination information of the request source terminal.

6. The transmission management system according to claim 5, wherein
   the processing circuitry further deletes the request source terminal from destination candidates of destination information of the one or more destination terminals designated by the destination deletion request.

7. The transmission management system according to claim 1, wherein
   when the receiver receives a mutual destination registration request designating a plurality of terminals, the processing circuitry registers another terminal designated by the mutual destination registration request in respective pieces of destination information of the terminals designated by the mutual destination registration request as a destination candidate.

8. The transmission management system according to claim 1, wherein
   when the receiver receives a mutual destination deletion request designating a plurality of terminals, the processing circuitry deletes another terminal designated by the mutual destination deletion request from respective pieces of destination information of the terminals designated by the mutual destination deletion request.

9. The transmission management system according to claim 1, wherein
   when the receiver receives a reset request designating one or more terminals, the processing circuitry deletes respective pieces of destination information of the one or more terminals designated by the reset request, and when the one or more terminals designated by the reset request are registered in the destination information of another terminal as destination candidates, deletes the one or more terminals designated by the reset request from the destination information of the other terminal.

10. The transmission management system according to claim 1, wherein the information that indicates whether a process of approval of the destination registration request is to be omitted is generated based on a displayed selection item being selected for omitting a process of approval of the destination registration request, the selection item being displayed on a display screen of a third terminal other than the request source terminal and the destination terminals, and the selection item being presented separately with respect to each destination terminal displayed on the display screen of the third terminal as the destination candidates.

11. A management method for a transmission management system that manages destination information indicating destination candidates of a request source terminal of communication, the method comprising:
   receiving a destination registration request designating one or more destination terminals as the destination candidates of the request source terminal from an external terminal other than the request source terminal and the one or more destination terminals, wherein the received destination registration request includes information that indicates whether a process of approval of the destination registration request is to be omitted, the process including
      transmitting an approval request for the destination registration request to the one or more request destination terminals designated at the destination candidates,
      receiving a response to the approval request from the one or more request destination terminals, and
   registering the request destination terminal that transmitted the response to the approval request indicating approval in the destination information of the request source terminal as a destination candidate;
   registering one or more request destination terminals in the destination information as destination candidates of the request source terminal when approval of the destination registration request can be omitted because the received destination registration request includes the information that the process of approval of the destination registration request is to be omitted, without transmitting the approval request for the destination registration request to the one or more request destination terminals designated at the destination candidates;
   transmitting an approval request for the destination registration request to the one or more request destination terminals designated as the destination candidates when the approval of the destination registration request cannot be omitted because the received destination registration request does not include the information that the process of approval of the destination registration request is to be omitted;
   receiving a response to the approval request from the one or more request destination terminals when the approval of the destination registration request cannot be omitted; and
   registering the request destination terminal that transmitted the response to the approval request indicating approval in the destination information of the request source terminal as a destination candidate when the approval of the destination registration request cannot be omitted.

12. The management method according to claim 11, wherein the information that indicates whether a process of approval of the destination registration request is to be omitted is generated based on a displayed selection item being selected for omitting a process of approval of the destination registration request, the selection item being displayed on a display screen of a third terminal other than the request source terminal and the destination terminals, and the selection item being presented separately with respect to each destination terminal displayed on the display screen of the third terminal as the destination candidates.

13. A non-transitory computer-readable recording medium that contains a computer program that causes a computer to execute:
   receiving a destination registration request designating one or more destination terminals as the destination candidates of the request source terminal from an external terminal other than the request source terminal and the one or more destination terminals, wherein the received destination registration request includes information that indicates whether a process of approval of the destination registration request is to be omitted, the process including
      transmitting an approval request for the destination registration request to the one or more request destination terminals designated at the destination candidates,
      receiving a response to the approval request from the one or more request destination terminals, and
   registering the request destination terminal that transmitted the response to the approval request indicating approval in the destination information of the request source terminal as a destination candidate;
   registering one or more request destination terminals in the destination information as destination candidates of the request source terminal when approval of the destination registration request can be omitted because the received destination registration request includes the information that the process of approval of the destination registration request is to be omitted, without transmitting the approval request for the destination registration request to the one or more request destination terminals designated at the destination candidates;
   transmitting an approval request for the destination registration request to the one or more request destination terminals designated as the destination candidates when the approval of the destination registration request cannot be omitted because the received destination registration request does not include the information that the process of approval of the destination registration request is to be omitted;
   receiving a response to the approval request from the one or more request destination terminals when the approval of the destination registration request cannot be omitted; and
   registering the request destination terminal that transmitted the response to the approval request indicating approval in the destination information of the request source terminal as a destination candidate when the approval of the destination registration request cannot be omitted.

14. The non-transitory computer-readable recording medium according to claim 13, wherein the information that indicates whether a process of approval of the destination registration request is to be omitted is generated based on a displayed selection item being selected for omitting a process of approval of the destination registration request, the selection item being displayed on a display screen of a third terminal other than the request source terminal and the destination terminals, and the selection item being presented separately with respect to each destination terminal displayed on the display screen of the third terminal as the destination candidates.

\* \* \* \* \*